US008660077B2

(12) United States Patent (10) Patent No.: US 8,660,077 B2
Prasad et al. (45) Date of Patent: *Feb. 25, 2014

(54) METHOD AND SYSTEMS FOR CONVEYING SCHEDULING INFORMATION OF OVERLAPPING CO-SCHEDULED USERS IN AN OFDMA-MU-MIMO SYSTEM

(75) Inventors: Narayan Prasad, Plainsboro, NJ (US); Mohammad Ali Khojastepour, North Brunswick, NJ (US); Meilong Jiang, Plainsboro, NJ (US); Xiaodong Wang, New York, NY (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/296,394

(22) Filed: Nov. 15, 2011

(65) Prior Publication Data

US 2012/0057558 A1 Mar. 8, 2012

Related U.S. Application Data

(62) Division of application No. 12/642,126, filed on Dec. 18, 2009.

(60) Provisional application No. 61/138,608, filed on Dec. 18, 2008, provisional application No. 61/138,611, filed on Dec. 18, 2008, provisional application No. 61/159,676, filed on Mar. 12, 2009.

(51) Int. Cl.
*H04W 4/00* (2009.01)
*H04W 28/04* (2009.01)
*H04W 72/04* (2009.01)

(52) U.S. Cl.
CPC .............. *H04W 28/04* (2013.01); *H04W 72/04* (2013.01)
USPC .......................................... 370/329; 370/338

(58) Field of Classification Search
USPC ............ 370/328, 329, 330; 375/260; 455/442
See application file for complete search history.

(56) References Cited

U.S. PATENT DOCUMENTS

2007/0223423 A1 9/2007 Kim et al.
2008/0025336 A1 1/2008 Cho et al.

(Continued)

FOREIGN PATENT DOCUMENTS

EP 1703643 A1 9/2006
KR 2007-0120820 A 12/2007

OTHER PUBLICATIONS

Trivellato M et al: "On transceiver design and channel quantization for downlink multiuser M IMO systems with limited feedback", IEEE Journal on Selected Areas in Communications, IEEE Service Center, Piscataway, US, vol. 26, No. 8, Oct. 1, 2008, pp. 1494-1504, XP011236225, ISSN: 0733-8716, DOI: 10.1109/JSAC.2008.081015.

(Continued)

*Primary Examiner* — Pao Sinkantarakorn
*Assistant Examiner* — Richard K Chang
(74) *Attorney, Agent, or Firm* — Joseph Kolodka; Akitaka Kimura

(57) ABSTRACT

Methods and systems for conveying or transmitting to any given user in an OFDMA-MU-MIMO system scheduling information of other co-scheduled users to permit the user to perform error-correction on received data and/or interference reduction on its received signals. The scheduling information can include resource block assignment, modulation constellations employed, coding rates employed, power levels utilized and precoder matrix indices used. Further, the scheduling information can be conveyed in part through dedicated reference symbol layers or pilot streams. Moreover, a base station may transmit a preliminary estimate of the total number of users the base station expects to schedule, or an upper-bound on the total number of users, to the MU-MIMO users to permit the MU-MIMO users to determine preferred precoder matrix indices and indications of channel quality indices.

12 Claims, 7 Drawing Sheets

(56) References Cited

U.S. PATENT DOCUMENTS

| | | |
|---|---|---|
| 2008/0031191 A1* | 2/2008 | Kashima et al. ............ 370/329 |
| 2008/0089458 A1* | 4/2008 | Wallace et al. ............. 375/371 |
| 2008/0132281 A1 | 6/2008 | Kim et al. |
| 2008/0219370 A1* | 9/2008 | Onggosanusi et al. ....... 375/260 |
| 2009/0041148 A1* | 2/2009 | Li et al. ..................... 375/267 |

OTHER PUBLICATIONS

Philips: "Comparison between MU-MIMO codebook-based channel reporting techniques for L TE down link", 3GPP Draft; R1-062483, 3rd Generation Partnership Project (3GPP), Mobile Competence Centre ; 650, Route Des Lucioles ; F-06921 Sophia-Antipolis Cedex ; France, vol. RAN WG1, No. Seoul, Korea; 20061004, Oct. 4, 2006, XP050103007.

"3rd Generation Partnership Project; Technical Specification Group Radio Access Network; Evolved Universal Terrestrial Radio Access (E-UTRA); Physical layer procedures (Release 8)", 3GPP Standard; 3GPP TS 36.213, 3rd Generation Partnership Project (3GPP), Mobile Competence Centre ; 650, Route Des Lucioles ; F-06921 Sophia-Antipolis Cedex; France, No. V8.4.0, Sep. 1, 2008, pp. 1-63, XP050377559.

Motorola: "L TE-A DL-MIMO Enhancements—8-Tx eNB and MU-MIMO Optimization", 3GPP Draft; R1-084406 DL-MIMO Enhancement (Motorola), 3rd Generation Partnership Project (3GPP), Mobile Competence Centre ; 650, Route des Lucioles ; F-06921 Sophia-Antipolis Cedex; France, No. Prague, Czech Republic; Nov. 5, 2008, XP050317668.

Ericsson: "Remaining Details on Control Signaling for the MUMIMO Transmission Mode", 3GPP Draft; R1-082464, 3rd Generation Partnership Project (3GPP), Mobile Competence Centre ; 650, Route des Lucioles ; F-06921 Sophia-Antipolis Cedex; France, vol. RAN WG1, No. Warsaw, Poland; Jun. 25, 2008, XP05011 0735.

"MU-MIMO: Demodulation at the Mobile Station ; C80216m-09_0078r1", Priority IEEE Draft; C80216M-09_0078R1, IEEE-SA, Piscataway, NJ USA, vol. 802.16m, Jan. 5, 2009, pp. 1-11, XPO 17634 758.

Motorola: "L TE-A DL-MIMO Enhancements—8-Tx eN and MU-MIMO Optimization", 3GPP Draft; R1-084406 DL-MIMO Enhancement (Motorola), 3rd Generation Partnership Project (3GPP), Mobile Competence Centre; 650, Route des Lucioles; F-06921 Sophia-Antipolis Cedex; France, No. Prauge, Czech Republic; 20081105, Nov. 5, 2008, XP050317668.

Ericsson: "Remaining Details on Control Signaling for the MUMIMO Transmission Mode", 3GPP Draft R1-082464, 3rd Generation Partnership Project (3GPP), Mobile Competence Centre; 650, Route des Lucioles; F-06921 Sophia-Antiplois Cedex; France, vol. RAN WG1, No. Warsaw, Poland; 20080625, Jun. 25, 2008, XP05011 0735.

"MuMimo: Demodulation at the Mobile Station; C80216m-09_0078r1", Priority IEEE DRAFT; C80216M-09_0078R1, IEEE-SA, Piscataway, NJ USA, vol. 802.16m, Jan. 5, 2009, pp. 1-11, XPO 17634 758.

* cited by examiner

METHOD AND SYSTEMS FOR CONVEYING SCHEDULING INFORMATION OF OVERLAPPING CO-SCHEDULED USERS IN AN OFDMA-MU-MIMO SYSTEM

RELATED APPLICATION INFORMATION

This application is a divisional of U.S. patent application Ser. No. 12/642,126, filed Dec. 18, 2009, which in turn claims to provisional application Ser. No. 61/138,608 filed on Dec. 18, 2008, provisional application Ser. No. 61/138,611 filed on Dec. 18, 2008 and provisional application Ser. No. 61/159,676 filed on Mar. 12, 2009, each of which is incorporated herein by reference.

BACKGROUND

1. Technical Field

The present invention relates to orthogonal frequency-division multiplexing based multiple access (OFDMA) multi-user (MU)-multiple input multiple output (MIMO) systems and, more particularly, to the conveyance of scheduling information to MU-MIMO users in such systems.

2. Description of the Related Art

In OFDMA MU-MIMO systems, each active user reports a preferred precoder matrix index (PMI), which identifies a specific vector (or matrix) in a code-book of unit norm vectors (or matrices) used to encode signals between the base station and users. Further, each user can report a channel quality index (CQI) to the base station, which, in turn, can use the PMI and CQI to determine an appropriate set of scheduled users and scheduling parameters for each user. The base station provides each scheduled user with its scheduling parameters indicating assigned resource blocks that comprise a set of subcarriers and OFDM symbols and that are used to transmit data to the respective scheduled user.

SUMMARY

In contrast to known systems, exemplary aspects of the present invention provide novel methods and systems that convey scheduling information of other co-scheduled users to each user. The scheduling information of co-scheduled users can be employed by a user to improve error correction on its received data and reduce interference on its received channels. Furthermore, exemplary aspects of the present invention also provide scheduled MU-MIMO users with a means to accurately estimate the interference it may experience when selecting a preferred PMI and CQI initially transmitted to a base station.

In one exemplary embodiment of the present invention, a method for determining, at a given MU-MIMO user, scheduling information of overlapping co-scheduled MU-MIMO users in an OFDMA system, includes: receiving identifiers assigned to different MU-MIMO users, wherein said identifiers identify respective regions of a control channel at which different scheduling information for respective MU-MIMO users are located; determining which MU-MIMO users are overlapping users, wherein an overlapping user is assigned at least one resource block (RB) that is also assigned to the given user, wherein an RB is a set of subcarriers and OFDM symbols; and accessing overlapping users' scheduling information using said identifiers to perform at least one of error correction on received data or interference reduction on received signals.

In another exemplary embodiment of the present invention, a method for determining attributes of communication channels of MU-MIMO users in an OFDMA system, the method comprising: receiving from a base station, for at least one sub-band of contiguous sub-carriers, an indication of an estimate of or an upper-bound on the total number of MU-MIMO users ($|S|$) that are co-scheduled by the base station on the at least one sub-band; determining a signal-to-interference-plus-noise ratio (SINR) for the at-least one sub-band based on the estimate of or the upper-bound on the total number of MU-MIMO users that are scheduled by the base station on the at least one sub-band; and transmitting to the base station an indication of a channel quality index (CQI) that is based on the SINR.

In an alternative exemplary embodiment of the present invention, a method for informing a base station of an indication of a channel quality index for at least one OFDMA sub-band employed by MU-MIMO users comprising: determining a signal-to-interference-plus-noise ratio (SINR) for the at least one OFDMA sub-band by calculating $$\frac{\tilde{\rho} \hat{c}^\dagger H^\dagger (I + \hat{\rho} H H^\dagger)^{-1} H \hat{c}}{1 - \tilde{\rho} \hat{c}^\dagger H^\dagger (I + \hat{\rho} H H^\dagger)^{-1} H \hat{c}},$$

where $\tilde{\rho}$ is $$\frac{\rho}{|S|},$$

$\rho$ is a constant that is proportional to the maximum bound of a sum power constraint, $\hat{c}$ is a beam forming vector from a codebook (C) of unit-norm vectors, H is a representative channel matrix for the at least one sub-band and I is the identity matrix; and transmitting to the base station the indication of a channel quality index, which is based on the determined SINR.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
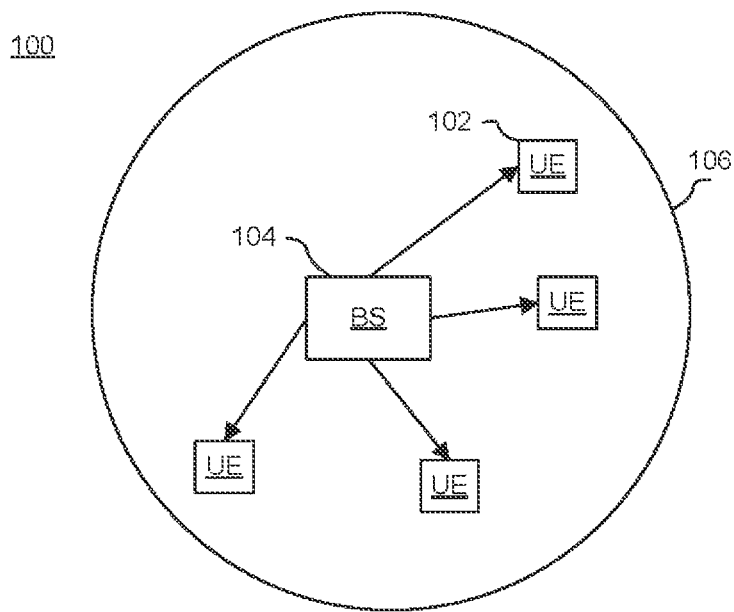
FIG. 1 is a high-level block diagram of an exemplary OFDMA-MU-MIMO system in accordance with an exemplary embodiment of the present invention.

Referring now in detail to the figures in which like numerals represent the same or similar elements and initially to FIG. 1, an OFDMA based multi-user (MU)-multiple input multiple output (MIMO) system 100 in which embodiments of the present invention may be implemented is illustrated. In the downlink of system 100, multiple scheduled users (UEs) 102 in a cell 106 are simultaneously served by a base station (BS) 104 on an available set of resource blocks (RBs), where each RB is a particular set of subcarriers and consecutive OFDM symbols.

In such a system, performance can be improved if a scheduled user is informed of some scheduling parameters of other overlapping co-scheduled users, such as their corresponding precoding matrices, power levels and modulations. For example, as discussed further below, such information permits the user to estimate effective channels, reduce demodulation errors and suppress interference due to transmissions intended for overlapping co-scheduled users. However, informing each user about the scheduling parameters of other overlapping co-scheduled users, in addition to its own parameters, also results in an increased signaling overhead. In addition, it is difficult to provide adequate information concerning scheduling parameters of overlapping co-scheduled users within the constraints imposed by the limited capacity of the downlink control channel.

In exemplary embodiments of the present invention discussed herein below, signaling design features are described which allow a base-station to efficiently convey the scheduling parameters of some or all of the other overlapping co-scheduled users to each scheduled user, in addition to that user's own scheduling parameters. Further, such features provide the scheduling parameters with only a relatively small increase in the downlink signaling overhead. Moreover, exemplary embodiments of the present invention increase system throughput as well as average user-throughput.

Figure 2:
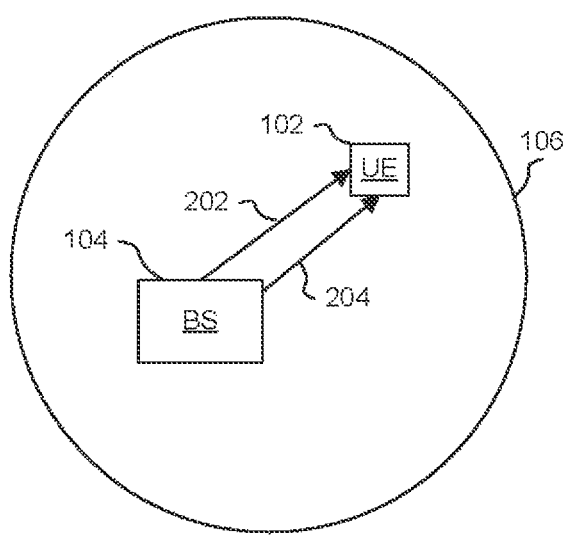
FIG. 2 is a high-level block diagram of an exemplary OFDMA-MU-MIMO system illustrating data and control channels in accordance with an exemplary embodiment of the present invention.

With reference now to FIG. 2, a base station 104 can communicate with a scheduled user 102 by employing a data channel 202 and a control channel 204. For example, data of all scheduled users may be transmitted over the data channel 202. A user can decode its data using the scheduling parameters made accessible to it. In turn, scheduling parameters of all scheduled users may be transmitted over the control channel 204. Each user can access its scheduling parameters along with at least some scheduling parameters of some or all of the overlapping co-scheduled users.

Figure 3:
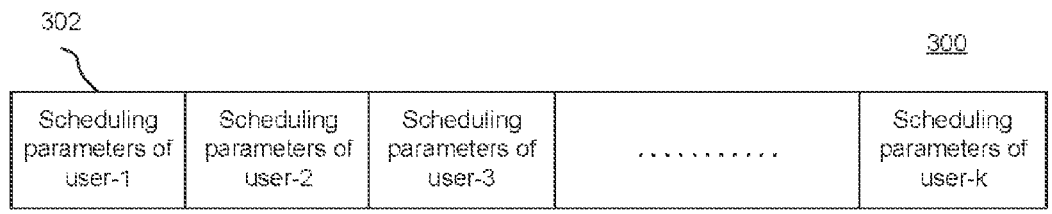
FIG. 3 is a high-level schematic of a downlink control channel in accordance with an exemplary embodiment of the present invention.

Referring to FIG. 3 with continuing reference to FIG. 2, a schematic 300 of the downlink control channel 204 in which the scheduling parameters of all scheduled users is transmitted is illustrated. For example, the scheduling parameters for each respective user, user-1 to user-k, may be transmitted in separate blocks 302. Here, each scheduled MU-MIMO user can access the part of the control region that includes its scheduling information using its user-ID, as discussed in more detail below.

Figure 4:
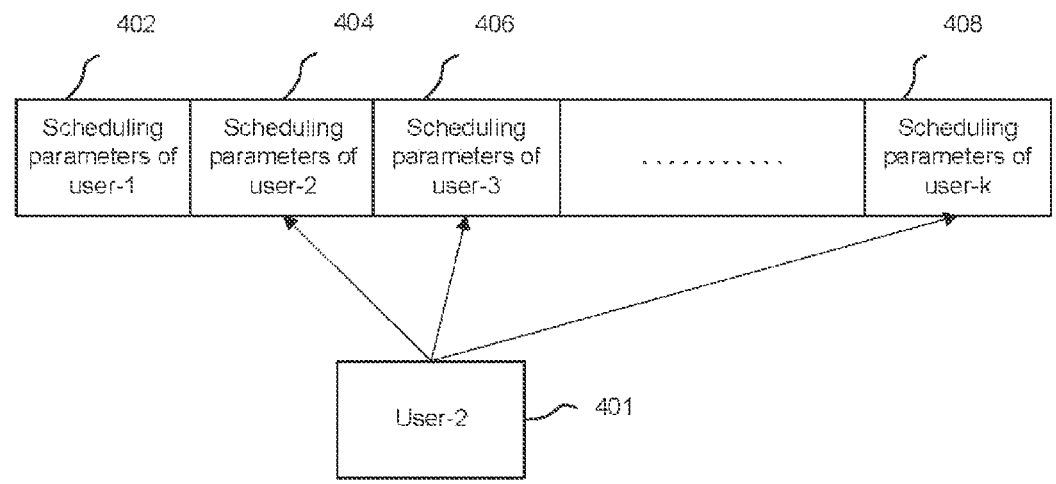
FIG. 4 is a high-level schematic of a downlink control channel used in a multi-access scheme in accordance with an exemplary embodiment of the present invention.

With reference to FIG. 4, in accordance with one exemplary embodiment of the present invention, referred to herein as a "multi-access scheme," each scheduled MU-MIMO user may be informed by the BS about the user IDs of some or all of the other overlapping co-scheduled MU-MIMO users. Thus, using the user IDs, a scheduled MU-MIMO user can access the respective parts of the control region that include the scheduling information for itself and for other users. For example, as shown in FIG. 4, a user-2 401 can access the scheduling parameter information 404 for itself and the scheduling parameter information 406 and 408 for user-3 and user-k, respectively.

Figure 5:
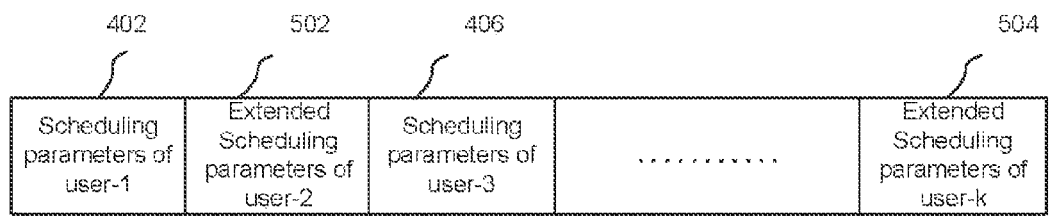
FIG. 5 is a high-level schematic of a downlink control channel used in an extended scheduling scheme in accordance with an exemplary embodiment of the present invention.

Referring to FIG. 5 with continuing reference to FIG. 4, in accordance with another exemplary embodiment of the present invention, referred to herein as an "extended scheduling scheme," a portion of the scheduling information of some or all of the other overlapping co-scheduled MU-MIMO users can be added to the scheduling information of a scheduled MU-MIMO user to form its extended scheduling information. For example, as shown in FIG. 5, user-1 and user-3 may have scheduling parameters 402, 406 designated for users 1 and 3, respectively, while users 2 and k may have extended scheduling parameters 502 and 504, respectively. Here, the extended scheduling parameters can include the scheduling parameters designated for a particular user and at least a portion of the scheduling parameters for some or all of the other overlapping co-scheduled MU-MIMO users. The extended scheduling information of some or all scheduled MU-MIMO users may be transmitted in the control channel in each sub-frame and can be accessed by the respective MU-MIMO user via its user ID.

In the MU-MIMO OFDMA downlink, multiple scheduled users or UEs can be simultaneously served by a base station (BS) on an available set of resource blocks (RBs), where each resource block is a time-frequency resource unit comprising a consecutive set of subcarriers and a consecutive set of OFDM symbols. The BS may have one or more transmit antennas and each UE may have multiple receive antennas. The BS may use linear transmit precoding to serve each scheduled user. The transmit precoder used by the BS and the modulation and coding scheme (MCS) it assigns to each scheduled user may depend on the feedback it receives from the users over the uplink control or data channel.

Using some higher layer signaling, the BS can configure a user to be a MU-MIMO user in a semi-static manner in which a user, once configured, remains in the MU-MIMO mode for several sub-frames until it is re-configured by the BS. Alternatively, the user can decide to be a MU-MIMO user and report its feedback information accordingly. A user can explicitly signal its preference to be a MU-MIMO user in its uplink feedback. Alternatively, a user can report its feedback information in any format but the BS can decide to schedule it as a MU-MIMO user. In this case, the user's scheduling information may include a flag or a feature that is unique to the MU-MIMO mode. Upon accessing its scheduling information, the user can determine that it is in the MU-MIMO mode.

The feedback procedure in which feedback is received by the base station from each user on the uplink channel can be implemented in a variety of ways. Each MU-MIMO user can report or feedback to the BS one precoder matrix index (PMI) per sub-band, which is a set of consecutive RBs, as well as one channel quality index (CQI) per codeword per sub-band. The size of the sub-band as well as the time interval between consecutive UE reports may be configured by the system in a semi-static manner and can be user-specific. The PMI determines a particular precoding matrix from a codebook, or a set, of precoding matrices which is known to all users as well as to the BS.

It should be noted that the uplink channel typically has a finite capacity to accommodate user feedback. Thus, to improve efficiency, methods that reduce the feedback from each user without significantly degrading the system performance should be employed.

One or more of the following aspects, or any appropriate combination thereof, can be employed to achieve this goal. In accordance with one such aspect, the ranks of all precoding matrices reported by a MU-MIMO user can be constrained to be identical. The system can also constrain the common rank to correspond to a particular rank, which can be UE specific. For example, the common rank can be rank-1. The maximum number of codewords that can be transmitted to each user is at-most equal to the rank of the precoding matrices used to serve that user.

In accordance with another exemplary aspect, the number of codewords for which the UE computes CQIs may be a function of the rank of its reported PMIs. This function can be pre-determined and identical across all users. In a special case, each user computes and reports only one CQI per sub-band for any rank, wherein this function returns 1 for any input rank.

Alternatively or additionally, according to another aspect, the system can constrain each MU-MIMO user to report or feedback to the BS, only one PMI, a wideband PMI, that is identical across all subbands and one CQI per codeword per sub-band. The system can also further constrain in a semi-static manner the reported PMI to correspond to a precoding matrix of a particular rank, which can be UE specific, for example, rank-1.

Alternatively or additionally, in another aspect, the system can constrain each MU-MIMO user to report or feedback to the BS only one PMI as well as one CQI per codeword that are identical across all subbands. The system can also further constrain the reported PMI in a semi-static manner to correspond to a precoding matrix of a particular rank, which can be UE specific, for example, rank-1.

Turning now to signaling on the downlink control channel, on the downlink control channel, in each scheduling interval, hereinafter referred to as a "subframe," the BS can transmit each scheduled user's scheduling information which can include its: RB assignment, assigned modulation constellation per code word, coding rate per codeword, the PMI(s) used and/or the transmit power levels used. It should be understood that the scheduling information for any given user can be different for different subframes. The PMIs and the power levels can either be explicitly conveyed as part of the scheduling information or, if user-specific dedicated pilots are employed, they can be implicitly conveyed by informing the user about the positions in which its dedicated pilots are transmitted. A dedicated pilot is a pilot, or reference symbol (RS), that is precoded using the precoder used for precoding data transmitted to a particular user and is itself transmitted on one or more subcarriers, OFDM symbol pair in an RB that is assigned to that user. Further, a dedicated pilot or RS can be scaled proportionally to the power level used for data transmission, where the proportionality factor can be known to the user. The positions, or, equivalently, the OFDM symbol and subcarrier indices, in an RB on which dedicated pilots for a given user are transmitted can be conveyed in the intended user's scheduling information. Moreover, the subband for which each dedicated pilot can be used for channel estimation can be inferred from the user's scheduling information. The intended user can then estimate columns of the effective channel matrix after accessing its scheduling information, which, as noted above, may include PMI(s), MCS per codeword and RB assignment. The effective channel matrix is the channel matrix multiplied by the precoding matrix, which, as stated above, can be scaled.

In each sub-frame, each scheduled user may have the ability to access the part of the control channel including its scheduling information. The downlink control channel has a finite capacity to accommodate the scheduling information of all scheduled users. Thus, to improve efficiency, methods for reducing the signaling overhead without significantly degrading system performance should be employed. One or more of the following aspects can be implemented to achieve this goal. In accordance with one such aspect, the BS may assign only one codeword per subframe to each user in the MU-MIMO mode so that the scheduling information for each user includes only one MCS field per subframe. According to another aspect, the BS may employ precoders of an identical rank to serve a user in the MU-MIMO mode. Further, in yet another aspect, the BS may employ only one precoder to serve a user in the MU-MIMO mode.

In accordance with exemplary embodiments of the present invention, a scheduled MU-MIMO user can access a part of the scheduling information of some or all of the other overlapping co-scheduled users in addition to its scheduling information. An "overlapping co-scheduled user" or "overlapping user" is one whose RB assignment has a non-zero overlap or intersection with that of the user.

Giving each scheduled user access to at least a part of some or all of the other co-scheduled users' scheduling information permits the user to utilize this information in decoding its own data. For example, if the user is informed of the precoders and power levels that are used to serve some or all of other co-scheduled users, or equivalently if the user is informed of the positions of the dedicated RS (DRS) corresponding to these co-scheduled users on each RB where there is an overlap, the user can estimate the corresponding effective channels and can design minimum mean-square error (MMSE) filters, for each one of its assigned subcarriers, to suppress the interference it encounters due to the transmissions intended for the other co-scheduled users. Further, if for each RB where there is an overlap, the user is informed of the precoders and power levels, or DRS positions, as well as the modulations that are used to serve some or all of the other co-scheduled users, the user can employ more sophisticated modulation-aware demodulators which generate more reliable log-likelihood ratios (LLRs) for its codewords and hence reduce its error probability. In addition, if the user is informed of the precoders and power levels, or DRS positions, the modulations and the coding rates that are used to serve some or all of the other co-scheduled users that overlap completely with itself, i.e., they have the same RB assignment, the user can perform interference cancellation by decoding the codewords of some or all of the other co-scheduled users and subtracting the re-constructed codewords.

It should be understood that although aspects of the present invention disclosed herein permit a given user to perform error correction on received data and/or interference reduction on a received signal by employing at least a portion of scheduling information of one or more overlapping users, the given user need not employ the received portion of scheduling information of overlapping users. For example, while received portions of scheduling information for overlapping users permit a user to perform error correction and/or interference reduction using the portions of scheduling information, the user may decide to ignore the portions of scheduling information of overlapping users to reduce complexity and thereby improve its processing speed.

According to exemplary embodiments, each scheduled user can access the portion of the control channel including its scheduling information by employing a user-identification (ID) assigned to it. There are several ways a scheduled MU-MIMO user can be provided access to all or a part of another overlapping co-scheduled MU-MIMO user's scheduling information. A few efficient, exemplary schemes are described herein below. The schemes can be classified as multi-access schemes and extended scheduling schemes, which were mentioned above with regard to FIGS. 4 and 5. It should be noted that, with the exception of the discussion concerning FIGS. 4 and 5, which distinguish multi-access and extended scheduling schemes, all aspects discussed above can be implemented in either or both the multi-access schemes and extended scheduling schemes.

Figure 6:
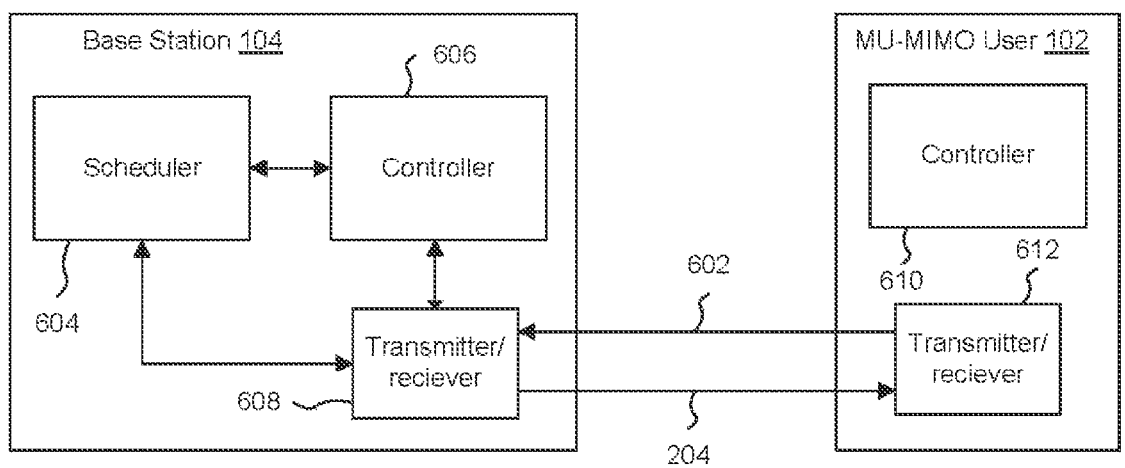
FIG. 6 is a high-level block/flow diagram of a base station and a MU-MIMO user in accordance with an exemplary embodiment of the present invention.

With reference now to FIG. 6, a more detailed block/flow diagram of the base station 104 system and the MU-MIMO user 102 system is illustrated. As noted above, base station 104 and the MU-MIMO user 102 can be employed to implement multi-access schemes and/or extended scheduling schemes in accordance with exemplary embodiments of the present invention. As discussed above, the user 102 can employ a transmitter/receiver 612 to transmit precoder matrix index information and channel quality index information to the base station 104 along uplink control channel 602. In turn, the base station 104 may transmit scheduling information to each MU-MIMO user using a transmitter/receiver 608 along a downlink control channel 204. The base station 104 may further include a scheduler 604 and a controller 606 while the user 610 can include controller to implement method embodiments of the present invention. The elements of base station 104 and MU-MIMO user 102 are discussed in more detail below with respect to multi-access schemes and extended scheduling schemes. It should also be noted the functions and configuration of the MU-MIMO user 102 is representative and can be implemented by any one or more or all other MU-MU-MIMO users serviced by the base station. Further, it should be understood that each element depicted in FIG. 6 can be implemented, for example, in entirely hardware or both hardware and software elements.

Multi-access Scheme

In the multi-access scheme, each scheduled MU-MIMO user is informed of the user IDs of some or all of the other overlapping co-scheduled MU-MIMO users. Here, the user can employ the user IDs to access the respective portions of the control regions that include the scheduling information of the other overlapping co-scheduled MU-MIMO users. A schematic of the multi-region access scheme is depicted in FIG. 4, discussed above.

Figure 7:
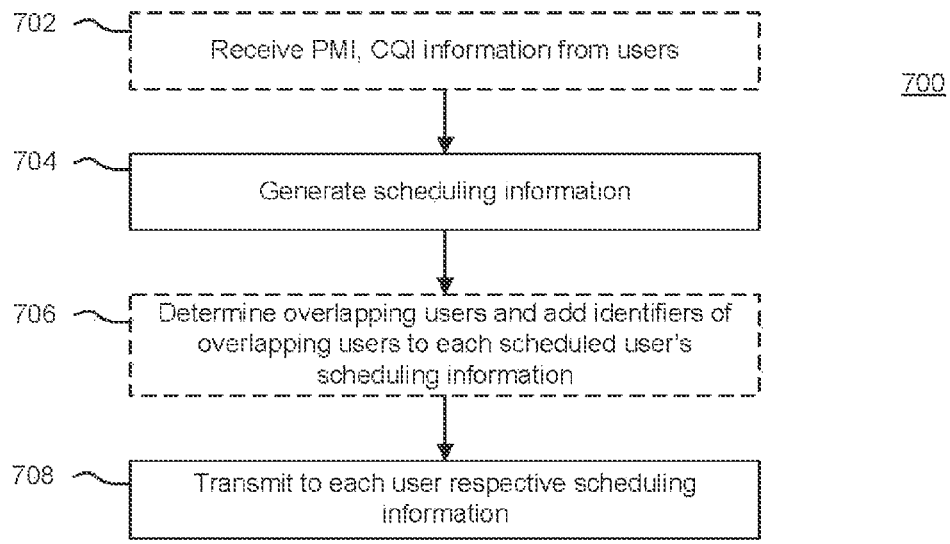
FIG. 7 is a high-level block/flow diagram of a method for conveying scheduling information of overlapping co-scheduled MU-MIMO users to a given MU-MIMO user in accordance with one exemplary embodiment of a multi-access scheme.

Referring to FIG. 7 with continuing reference to FIG. 6, a method 700 for conveying scheduling information of overlapping co-scheduled MU-MIMO users to a given MU-MIMO user in accordance with one exemplary embodiment of a multi-access scheme is illustrated. An overview of method 700 is provided here. However, it should be understood that detailed implementations and variations of method 700 are discussed further below with respect to multi-access schemes in general. Method 700 may begin at optional 702, in which the base station 104 can employ transmitter/receiver 608 to receive preferred precoder matrix index information and/or channel quality index information from each user, as discussed above. At step 704, the scheduler 604 of base station 104 may select an appropriate set of users to schedule and may generate scheduling information for each MU-MIMO user in the set, such as MU-MIMO user 102, as discussed above. At optional step 706, for each scheduled MU-MIMO user, the controller 606 may determine which of the scheduled MU-MIMO users are overlapping users and may add identifiers that correspond to overlapping users to each user's scheduling information. As stated above, the identifiers can identify different regions of the control channel 204 that include the scheduling information for the overlapping MU-MIMO users. At step 708, the base station 104 can transmit respective scheduling information to each user on the control channel 204 by employing transmitter/receiver 608.

Figure 8:
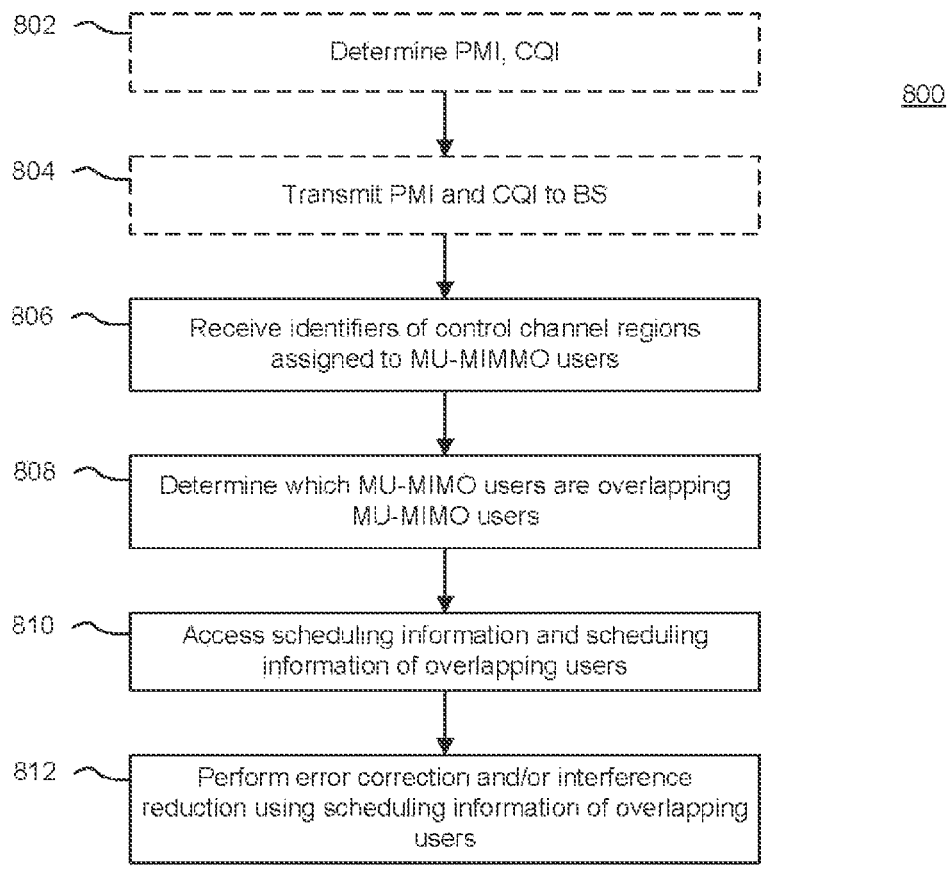
FIG. 8 is a high-level block/flow diagram of a method for receiving and determining scheduling information of overlapping co-scheduled MU-MIMO users in accordance with an exemplary embodiment of a multi-access scheme.

With reference now to FIG. 8, with continuing reference to FIGS. 6 and 7, a method 800 for receiving and determining scheduling information of overlapping co-scheduled MU-MIMO users in accordance with an exemplary embodiment of a multi-access scheme is illustrated. Like method 700, an overview of method 800 is provided here and detailed implementations and variations of method 800 are discussed further below with respect to multi-access schemes. Method 800 can be performed at any given MU-MIMO user, such as user 102, and can complement method 700. The method can begin at optional step 802, in which the controller 610 of user 102 may determine preferred precoder matrix index information and/or channel quality information. The determination of PMI and CQI information at a MU-MIMO user can be performed using one or more novel methods discussed in more detail below with respect to FIGS. 12, 13 and 14. However, for the sake of brevity, a description of the PMI and CQI preliminary determination methods are omitted here. At optional step 804, the MU-MIMO user 102 can employ transmitter/receiver 612 to transmit the preferred precoder and/or channel quality information to the base station 104. At step, 806, using transmitter/receiver 612, the user 102 can receive identifiers assigned to different MU-MIMO users. As noted above, the identifiers can identify respective regions of control channel 204 at which different scheduling information for respective MU-MIMO users are located. At step 808, the controller 610 can determine which MU-MIMO users are overlapping users. For example, the controller 610 can determine the overlapping MU-MIMO users by comparing RB assignment fields in the scheduling information for each of the different MU-MIMO users to RB assignment fields in scheduling information for user 102. Thus, a MU-MIMO user is determined to be an overlapping user if it is assigned an RB that is also assigned to user 102. Alternatively, as mentioned above, the scheduling information for user 102 received from the base station can include identifiers assigned to overlapping users. The controller 610 of user 102 can determine and access the overlapping users' scheduling information by referencing the identifiers assigned to overlapping users in the scheduling information for user 102. At step 810, the controller 610 of user 102 can access the overlapping users' scheduling information using the identifiers. At step 812, controller 610 of user 102 can utilize the scheduling information of overlapping users to perform at least one of error correction on received data or interference reduction on received signals, as discussed above.

It should be understood that the multi-region access scheme can be implemented in a variety of ways using one or more of the following aspects. In accordance with one such aspect, as noted above, the IDs of some or all of the other overlapping co-scheduled MU-MIMO users can themselves be a part of a scheduled MU-MIMO user's scheduling information.

According to another such aspect, in each sub-frame, the BS can transmit or broadcast the IDs of all MU-MIMO users scheduled in that sub-frame in a portion of the control channel reserved for this purpose. For example, at step 808 of method 800, each MU-MIMO user can thus determine the IDs of all co-scheduled MU-MIMO users. Each user can then access their RB assignment fields in its respective scheduling information and determine which co-scheduled MU-MIMO users are overlapping with itself The starting point of this zone or portion of the control channel where the MU-MIMO UE IDs are present may be fixed and may include the number of MU-MIMO users scheduled in that sub-frame. Together, the starting point and the number will determine the size of the zone including the MU-MIMO UE IDs. Further, the starting point can depend on the cell ID and can be conveyed to a user by a base station once it enters the cell.

In another aspect, the BS can configure a user as a MU-MIMO user in a semi-static manner in that a user remains in the MU-MIMO mode for several sub-frames until it is re-configured by the BS. In a semi-static manner, once in several sub-frames, the BS can broadcast or transmit, for example, at step 708 of method 700, the IDs of all users configured in the MU-MIMO mode in a portion of the control channel reserved for this purpose. For example, at step 808 of method 800, each MU-MIMO user can thus determine the IDs of all other MU-MIMO users. The particular sub-frame whose control channel includes the MU-MIMO user IDs can be cell-specific. This sub-frame can be transmitted by the base station in a periodic fashion, for example, once every several sub-frames, or in an a-periodic fashion, in which case the users are informed about the transmission of the user-IDs using some other signaling. The starting point of the zone or portion of the control channel of the particular sub-frame where all the MU-MIMO UE IDs are present can be fixed and can include the number of users in the MU-MIMO mode. Together, the starting point and the number will determine the size of the zone including the MU-MIMO UE IDs.

In accordance with another aspect, the semi-static case can be implemented slightly differently. As noted above, in the semi-static case, a user remains in the MU-MIMO mode for several sub-frames until it is re-configured by the BS. Here, in the control channel of each sub-frame, the BS can transmit or broadcast, for example, at step 708 of method 700, the scheduling information of all scheduled MU-MIMO users in a part of the control channel reserved for this purpose. The starting point of this zone or portion of the control channel where the scheduling information of all the scheduled MU-MIMO users is present can be fixed and can include the number of MU-MIMO users scheduled in that sub-frame. Together, the starting point and the number will determine the size of the zone comprising the MU-MIMO scheduling information. The starting point can depend on the cell ID and can be conveyed to a user once it enters the cell via a composite ID. Thus, for example, at step 808 of method 800, each MU-MIMO UE can determine the region of the control channel including its own scheduling information using its UE ID and a mapping function specific to the MU-MIMO mode. Here, for example, each MU-MIMO UE can first access its scheduling information and then access the scheduling information of all users in the MU-MIMO zone. Alternatively, the number of MU-MIMO scheduled in that sub-frame need not be conveyed. Instead, each scheduled MU-MIMO user's scheduling information can have a special flag unique to the MU-MIMO mode of transmission. For example, each MU-MIMO user can first access its scheduling information in the control channel using its UE ID and a mapping function specific to the MU-MIMO mode. Each MU-MIMO UE can start accessing the scheduling information of other MU-MIMO UEs beginning from the starting point of the MU-MIMO zone in the control channel. Each user can determine that it has reached the end of region of the control channel including the relevant scheduling information when the user encounters scheduling information that belongs to a non MU-MIMO UE.

It should be noted here that exemplary embodiments of the present invention include employing dedicated reference symbol layers to convey assigned precoder matrix index and power level information, as well as conveying modulation constellations employed by co-scheduled MU-MIMO users. Dedicated reference symbol layers are discussed in more detail below with respect to the extended scheduling scheme. However, it should be understood that all features discussed herein below with respect to dedicated reference symbol layers can be implemented in multi-access scheme embodiments as well as other extended scheduling scheme embodiments as understood by those of ordinary skill in the art. For example, indices directed to each user in the extended scheduling scheme conveying the dedicated resource symbol layers and modulation constellations employed by a user can be accessed by other users in the multi-access scheme. For example, using control channel identifiers of overlapping users, a given user can access the dedicated reference symbol layers and information about modulation constellations located in the overlapping user's scheduling information. The access of scheduling information directed to other users can permit any given user to learn precisely which other users employ which dedicated reference symbol positions and which modulation constellations to improve error correction on received data and/or interference reduction on received signals. For the sake of brevity, the details of how dedicated reference symbol layers can be employed to convey precoder matrix index information, power levels and other scheduling information are not repeated here.

Extended Scheduling Scheme

In the extended scheduling scheme, at least a portion of the scheduling information of some or all of the other overlapping co-scheduled MU-MIMO users is added to the scheduling information of a scheduled MU-MIMO user to form its extended scheduling information. A schematic of the downlink control channel is depicted in FIG. 5, discussed above. Here, the extended scheduling information of a scheduled MU-MIMO user may be transmitted in the control channel in each sub-frame and may be accessed by the respective MU-MIMO user via its user ID. Exemplary implementations of an extended scheduling scheme are described herein below.

Figure 9:
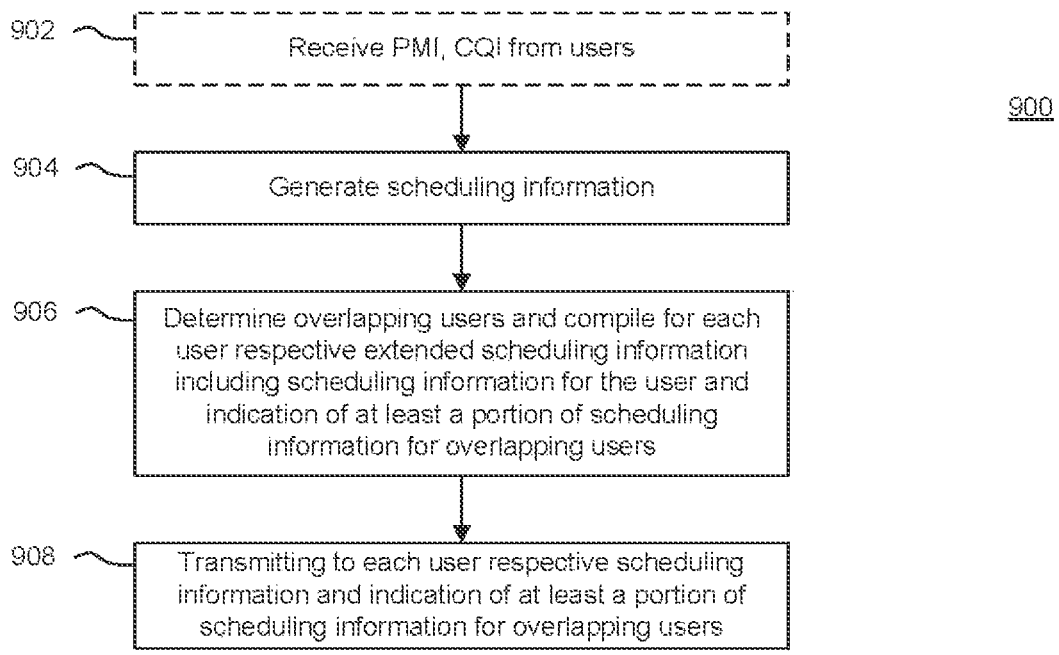
FIG. 9 is a high-level block/flow diagram of a method for conveying scheduling information of overlapping co-scheduled MU-MIMO users to a given MU-MIMO user in accordance with one exemplary embodiment of an extended scheduling scheme.

With reference now to FIG. 9 with continuing reference to FIG. 6, a method 900 for conveying scheduling information of overlapping co-scheduled MU-MIMO users to a given MU-MIMO user in accordance with one exemplary embodiment of an extended scheduling scheme is illustrated. An overview of method 900 is provided here. However, it should be noted that detailed implementations, variations and features of method 900 are discussed further below. Method 900 may begin at optional 902, in which the base station 104 can employ transmitter/receiver 608 to receive preferred precoder matrix index information and/or channel quality index information from each user, as discussed above. At step 904, the scheduler 604 of base station 104 may select an appropriate set of users to schedule and may generate scheduling information for each MU-MIMO user in the set, such as MU-MIMO user 102, as discussed above. Scheduling information generation may comprise allocating or assigning to each MU-MIMO user resource blocks, modulation constellation per codeword, coding rate per codeword, at least one PMI and/or at least one transmit power value. Assignment of resource blocks is discussed in more detail below. At step 906, for each scheduled MU-MIMO user, the controller 606 may determine which of the scheduled MU-MIMO users are overlapping users and may also compile for each scheduled user extended scheduling information. For any given user, such as user 102, the extended scheduling information may include both the scheduling information generated for the given user at step 902 and an indication of at least a portion of the scheduling information for at least one overlapping user. At step 908, the base station 104 can transmit respective extended scheduling information to each user on the control channel 204 by employing transmitter/receiver 608. As discussed above, the indication of at least a portion of scheduling information for overlapping users can be employed by the given user to perform at least one of error correction on received data or interference reduction on a received signal.

Figure 10:
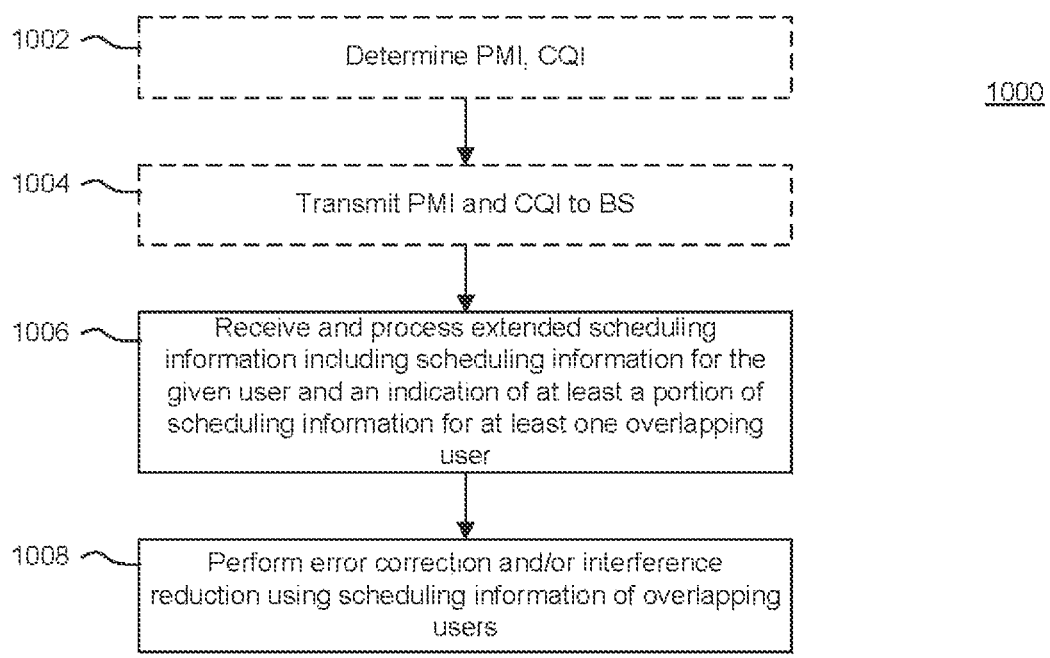
FIG. 10 is a high-level block/flow diagram of a method for receiving and determining scheduling information of overlapping co-scheduled MU-MIMO users in accordance with an exemplary embodiment of an extended scheduling scheme.

With reference now to FIG. 10, with continuing reference to FIGS. 6 and 9, a method 1000 for receiving and determining scheduling information of overlapping co-scheduled MU-MIMO users in accordance with an exemplary embodiment of an extended scheduling scheme is illustrated. Similar to method 900, an overview of method 1000 is provided here and detailed implementations and variations of method 1000 are discussed further below with respect to extended scheduling schemes. Method 1000 can be performed at any given MU-MIMO user, such as user 102, and can complement method 900. The method can begin at optional step 1002, in which the controller 610 of user 102 may determine preferred precoder matrix index information and/or channel quality information. The determination of PMI and CQI information at a MU-MIMO user can be performed using one or more methods discussed in more detail below with respect to FIGS. 12-14. At optional step 1004, the MU-MIMO user 102 can employ transmitter/receiver 612 to transmit the preferred precoder and/or channel quality information to the base station 104. At step, 1006, using transmitter/receiver 612 and the controller 610, respectively, the user 102 can determine and process extended scheduling information. As noted above, the extended scheduling information can include both the scheduling information generated for the user 102 and an indication of at least a portion of the scheduling information for at least one overlapping user. At step 1008, controller 610 of user 102 can utilize the scheduling information of overlapping users to perform at least one of error correction on received data or interference reduction on received signals, as discussed above. Exemplary features and variations of extended scheduling schemes that can be employed in methods 900 and/or 1000 are described herein below.

In accordance with exemplary features of the present invention, the system can only allow complete overlap among any two overlapping co-scheduled MU-MIMO users. In other words, any two overlapping co-scheduled MU-MIMO users will be assigned an identical set of RBs. Moreover, each scheduled MU-MIMO user can be served using only one precoder and one MCS per-codeword or only one precoder and one MCS per-codeword per subframe. Here, the number of codewords for each user can at-most be equal to the rank of the precoder used to serve that user. The (PMI, modulations) pairs of some or all of the other overlapping co-scheduled MU-MIMO users can be a part of each scheduled MU-MIMO user's scheduling information, where each pair corresponds to one overlapping co-scheduled MU-MIMO user. In each such pair (PMI, modulations), the field "modulations" can convey the modulation constellation corresponding to each codeword of the overlapping co-scheduled MU-MIMO user. Given such a pair (PMI, modulations) and the assigned RBs, a mapping rule can be employed by the MU-MIMO users to determine the modulation corresponding to each column of the precoder determined by the PMI, for each assigned RB. This mapping rule can be pre-determined and identical across all users and can be known to them. In case each MU-MIMO user is served using only one codeword or only one codeword per subframe, the field "modulations" can include only one element that corresponds to all columns of the precoder determined by the PMI. Alternatively, the system can be constrained to permit only a common modulation constellation for all of its overlapping co-scheduled MU-MIMO users. In this case, the field "modulations" can be dropped.

According to other exemplary features of the present invention, the extended scheduling information can, for example, include the information on the positions used for transmitting the dedicated pilots of some or all of the other overlapping co-scheduled MU-MIMO users. It can also include the modulation schemes used to serve some or all of the other overlapping co-scheduled MU-MIMO users. Further, the extended scheduling information signaling design should permit each scheduled MU-MIMO user to determine all the dedicated pilot positions corresponding to at least one other overlapping co-scheduled MU-MIMO user on each of its assigned RBs for which there is an overlap.

Optionally, on each of a MU-MIMO user's assigned RBs for which there is an overlap, the extended scheduling information can permit the MU-MIMO user to determine if any two known dedicated pilot positions are assigned to the same user or not. In addition, optionally, on each of a MU-MIMO user's assigned RBs for which there is an overlap, the extended scheduling information can permit the MU-MIMO user to determine if any two known dedicated pilot positions are assigned to users with the same modulation type and, if so, to determine the modulation constellation type.

Figure 11A:
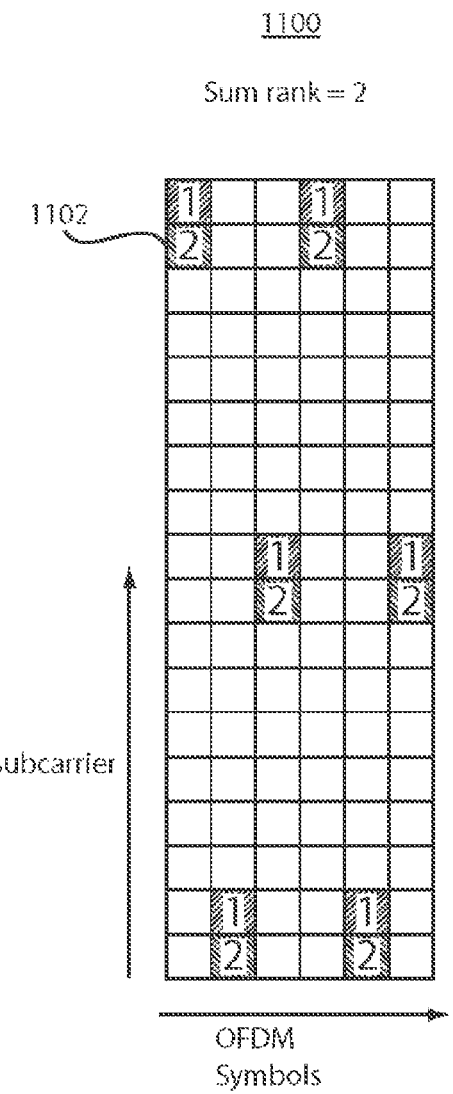
FIGS. 11A and 11B are diagrams of resource blocks including dedicated reference symbol layers in accordance with exemplary embodiments of the present invention.
Figure 11B:
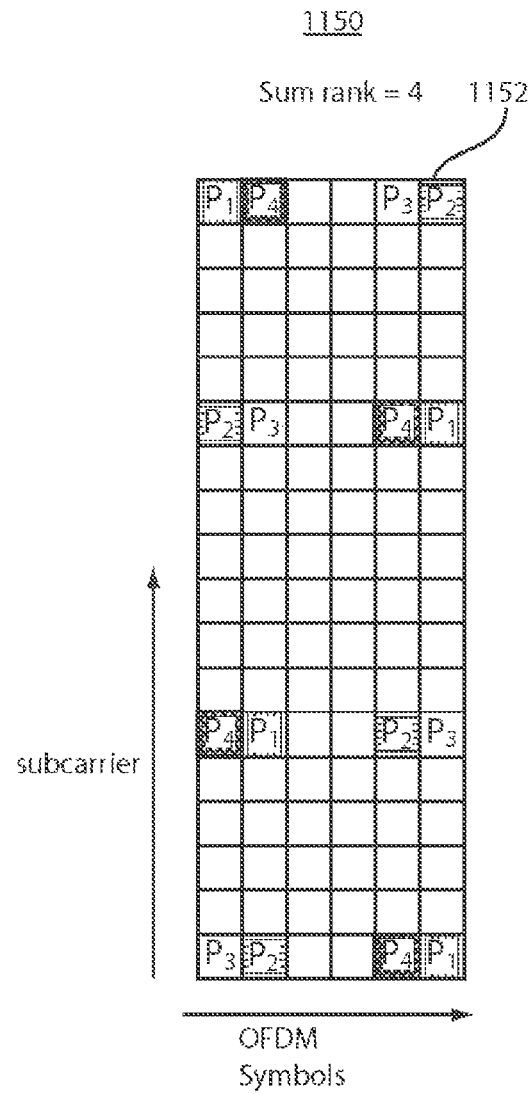

With reference now to FIGS. 11A and 11B, exemplary diagrams of reference blocks 1100 and 1150 having a sum rank of two and four, respectively, are illustrated. As shown in the examples in FIGS. 11A and 11B, the configurations of dedicated RS positions, such as positions 1102 and 1152, on each RB can be pre-defined for each choice of the sum rank, which is equivalent to the total number of layers, transmitted on that RB, and can be known to all users and the BS. Thus, the total number of layers on an RB can be indicative of a corresponding pre-defined configuration of RS layers. For a given choice of the sum rank, or the total number of layers, transmitted on that RB, the dedicated RS positions for each layer in a corresponding pre-defined configuration may be identified by a unique number or index. For example, as shown in FIG. 11A, in RB 1100, with a sum rank of two, the dedicated RS positions for the first layer can correspond to the blocks labeled "1" while the dedicated RS positions for the second layer can correspond to the blocks labeled "2." Similarly, as shown in FIG. 11B, in block 1150, with a sum rank of four, the dedicated RS positions for the first, second, third and fourth layers can correspond to the blocks labeled "P1," "P2," "P3," and "P4," respectively. Accordingly, the positions of a particular dedicated RS layer in a pre-defined configuration of dedicated RS layers on a given RB can be indicated by an index assigned to the particular dedicated RS layer.

Thus, with pre-defined, per RB dedicated RS positions, a scheduled MU-MIMO user's scheduling information can include one or more indices for each of its assigned RBs, along with the total number of layers transmitted on that RB, which together inform the user about its dedicated RS positions. Here, for a given total number of transmitted layers, all dedicated RS positions corresponding to a layer, referred to herein as a dedicated RS layer, may be identified by a unique index. In addition, a pilot stream is one example of a dedicated RS layer.

Optionally, a scheduled MU-MIMO user to which multiple layers are transmitted, may only be assigned a set of dedicated RS layers with consecutive indices on each of its allocated RBs. Further, each user that is assigned a particular RB can be assigned a different set of RS layers, wherein the RS layers within a set have consecutive indices. Moreover, the number of layers transmitted to a scheduled MU-MIMO user can be identical across all its assigned RBs and can be the same as the rank of the precoder(s) used to serve it. Thus, the scheduling information for a particular MU-MIMO user can include the number of its layers and, for each of its allocated RBs, the total number of layers transmitted on that RB and the smallest (first) index among its assigned dedicated RS layers. Accordingly, for each of its allocated RBs, the MU-MIMO user can determine that its dedicated RS positions are simply the smallest (first) index and the next, (n−1) consecutive indexes, where n is the number of its layers for a corresponding RB. Moreover, in the case in which each scheduled MU-MIMO user is also served using only one codeword, for each RB assigned to that user on which there is an overlap, that user's extended scheduling information may include a field termed "modulations," which may in turn include the modulation constellations of some or all of the overlapping co-scheduled users. The association of the modulation to the associated DRS layer should be unambiguously conveyed. For example, a modulation field having a length equal to the total number of layers assigned to other users can be included, where the leftmost element corresponds to the DRS layer of the smallest index assigned to another user, the second from left element corresponds to the DRS layer of the second smallest index assigned to another user and so on. In addition, for example, if three distinct modulations are employed, each element of the field can be a ternary digit specifying the three distinct modulations, such as quadrature phase-shift keying (QPSK), 16 quadrature (QAM) and 64 QAM, respectively. Alternatively, each element of the field can be a quaternary digit specifying the three distinct modulations, QPSK,16 QAM and 64 QAM, for example, and a modulation not-available option, respectively.

Optionally, each scheduled MU-MIMO user can be assigned a set of indices of dedicated RS layers that is common for all of its assigned RBs. Here, the set of indices may convey the dedicated RS layers for each of the corresponding user's assigned RB's. In addition, the assigned dedicated RS layers can also, optionally, be restricted to have consecutive indices, as discussed above. In other words, the base station can assign the same number of dedicated RS layers to the user for each of the user's assigned RBs such that the indices of the dedicated RS layers assigned to the user are drawn from a common set of consecutive integers. Thus, each scheduled MU-MIMO user's scheduling information may now include its assigned number of layers and the smallest (first) index among its assigned dedicated RS layers and, for each of its allocated RBs, the total number of layers transmitted on that RB. Accordingly, the assigned number of dedicated RS layers and the smallest index from the set of consecutive integers can be transmitted only once to convey the dedicated RS layers for all of the user's assigned RBs.

In accordance with an exemplary aspect of the present invention, on any RB and for any given choice of the total number of transmitted layers on that RB, if a dedicated RS layer is assigned to some user, then all dedicated RS layers having smaller indices shall also be assigned to one or more users. For example, a case in which each scheduled MU-MIMO user is assigned only consecutively indexed dedicated RS layers on each of its assigned RBs is considered. Here, only the user's assigned number of layers along with the per-RB, total number of layers transmitted and the per-RB, smallest (first) index of the user's assigned dedicated RS layers can be conveyed to adequately inform the user of its dedicated RS positions.

For example, if the number of assigned layers is 2 and for a particular assigned RB, the total number of transmitted layers is 4 and the smallest dedicated RS layer index is 2, the user can employ the pre-defined dedicated RS pattern for 4 layers to infer that dedicated RS layers with indices 2 and 3 are for the user, whereas dedicated RS layers indexed 1 and 4 are for the other users. It should be noted that the user can, of course, infer dedicated RS layers as discussed herein in steps 810 and 1006 of methods 800 and 1000, respectfully.

Additionally, the smallest index can also be identical across all the assigned RBs, in which case it can be conveyed once (i.e., not repeated) for all the assigned RBs.

Optionally, for each scheduled MU-MIMO user, the base-station scheduler can ensure that the same total number of layers are transmitted on all the user's assigned RBs on which there is an overlap. Here, each scheduled MU-MIMO user's scheduling information may include this number and a bit for each of its assigned RBs, which can indicate whether there is an overlap or not. Optionally, for each scheduled MU-MIMO user, the base-station scheduler can ensure that the same total number of layers are transmitted on all of the user's assigned RBs. Here, each scheduled MU-MIMO user's scheduling information can include this number. In either of these two optional cases, each scheduled MU-MIMO user may be assigned only consecutively indexed dedicated RS layers on each of its assigned RBs. Thus, only the number of its layers and, for each of its assigned RBs, the smallest (first) index of its assigned dedicated RS layers are sufficient to permit a given user to infer all its dedicated RS layers and those of the other overlapping users on each assigned RB. Here, the total number of layers can be transmitted only once for all of the user's assigned RBs. Optionally, as noted above, the indices of the dedicated RS layers assigned to the user can also be identical across all the user's assigned RBs, in which case the smallest index can be conveyed only once to permit the user to determine its dedicated RS positions. It should also be noted that signaling may be reduced by accounting for the fact that, from a user's perspective, for each RB, there are three possibilities: not assigned, assigned with no overlap, and assigned with overlap.

Optionally, each scheduled MU-MIMO user can be permitted to overlap with the same number of co-scheduled users on each of its assigned RBs for which there is an overlap.

Thus, the same total number of layers are transmitted on all its assigned RBs on which there is an overlap. Here, each scheduled MU-MIMO user's scheduling information can include the total number of layers. Thus, where the same number of users or the same total number of dedicated RS layers on any RB assigned to a user, the number of users or the total number of dedicated RS layers can be transmitted by the base station in the user's scheduling information only once per subframe to convey the dedicated RS layers for all of the user's assigned RBs. The scheduling information can also have a bit for each of its assigned RBs which indicates whether there is an overlap or not. Accordingly, from a user's perspective, for each RB there are three possibilities: not-assigned, assigned-no-overlap and assigned-with-overlap. Optionally, each scheduled MU-MIMO user can be allowed to overlap with the same number of co-scheduled users on all of its assigned RBs. Thus, the same total number of layers are transmitted on all of the scheduled MU-MIMO user assigned RBs. In either of these optional cases, if each scheduled MU-MIMO user is assigned only consecutively indexed dedicated RS layers on each of its assigned RBs, with the indices of the dedicated layers being common across all assigned RBs, then the number of its layers and the smallest (first) index of its assigned dedicated RS layers are sufficient to permit the user to infer all its dedicated RS layers and those of the other overlapping users on each assigned RB. Accordingly, the number of its layers and the smallest (first) index of its assigned dedicated RS layers can be transmitted only once per sub-frame to indicate all its dedicated RS layers and those of the other overlapping users on all RBs assigned to the user.

Optionally, each scheduled MU-MIMO user can be permitted to overlap with the same set of co-scheduled users on each of its assigned RBs for which there is an overlap. Thus, the same total number of layers are transmitted on all of a scheduled MU-MIMO user's assigned RBs on which there is an overlap. Each scheduled MU-MIMO user's scheduling information can include a bit for each of its assigned RBs which indicates whether there is an overlap or not. Further, from a user's perspective, for each RB there are three possibilities: not-assigned, assigned-no-overlap and assigned-with-overlap. Optionally, each scheduled MU-MIMO user can be permitted to overlap with the same set of co-scheduled users on all of its assigned RBs. Thus, the same total number of layers are transmitted on all of a scheduled user's assigned RBs. In either of these two optional cases, if each scheduled MU-MIMO user is assigned only consecutively indexed dedicated RS layers on each of its assigned RBs, with the indices of the dedicated RS layers being common across all its assigned RBs, then the number of its layers and the smallest (first) index of its assigned dedicated RS layers are sufficient to permit the scheduled MU-MIMO user to infer all its dedicated RS layers and those of the other overlapping users on each assigned RB. Moreover, the modulation(s) corresponding to some or all of the overlapping users can be conveyed once in its extended scheduling information, irrespective of the number of its overlapping assigned RBs.

In accordance with an exemplary aspect of the present invention, it should be noted that if an MU-MIMO user can be assigned multiple layers, the association of dedicated RS layers to co-scheduled users can be conveyed via a user association field (UAF), which can be implemented as a string of bits.

For example, implementing exemplary aspects of the present invention discussed above, on any RB, if the total number of layers is 6 and the user has been assigned 2 layers, the UAF length can be 4 bits. Moreover, if the user has been assigned dedicated RS layers with indices 3 and 4, then dedicated RS layers with indices 1,2,5,6 correspond to the other users. Here, the UAF has a bit for each of these four layers with the first, leftmost bit corresponding to the layer with the smallest index, 1 in this case, and can always be 1. The last, rightmost bit corresponds to the layer with the largest index, 6 in this case. Then, reading the field from left to right, a transition from 1-to-0 or 0-to-1 can imply a change in the assigned user. For example, 1110 implies that the layers 1, 2 and 5 are assigned to a particular user and that the layer 6 is assigned to another user. For example, 1010 implies that the layers 1, 2, 5 and 6 are all assigned to distinct users.

In accordance with another exemplary aspect of the present invention, the association of dedicated RS layers to modulations can also be conveyed via a modulation association field (MAF), which can be implemented as a string of ternary digits.

For example, if the total number of layers is 6 and the user has been assigned 2 layers, the MAF length can be 4 digits. Again, using the same example mentioned above, if the user has been assigned dedicated RS layers 3 and 4, then dedicated RS layers with indices 1,2,5,6 correspond to the other users. The MAF can have a ternary digit for each one of these four layers with the first, leftmost digit corresponding to the layer with the smallest index, 1 in this case. The last, rightmost digit can correspond to the layer with the largest index, 6 in this case. If the MAF is represented as a string of ternary digits, then the three values each digit can take can correspond to the three distinct modulation constellations, which may be, for example, QPSK, 16 QAM and 64 QAM, respectively. Alternatively, each element of MAF can be a quaternary digit specifying the three distinct modulations QPSK, 16 QAM and 64 QAM, along with a modulation not-available option, respectively.

However, it should be understood that the number or type of digits employed for the UAF and MAF, respectively, can be varied in accordance with design choice with respect to the total number of layers employed for an RB and a total number of modulation constellations utilized in the system, respectively.

The UAF and the MAF can be also conveyed on a per-RB basis for some or all of the assigned RBs. In this case, they can be constructed by considering a particular assigned RB and using the total number of layers transmitted on that RB and the dedicated RS layers assigned to the user on that RB.

Optionally, the base station scheduler can ensure that for each scheduled MU-MIMO user, the modulations assigned to all other overlapping co-scheduled users, respectively, which have been assigned dedicated RS layers with smaller indices, cannot have a cardinality larger than that of the modulation assigned to the user. Additionally, in this case, MAF, possibly for some or all assigned RBs, can also be conveyed as a string of digits.

Considering the previous example mentioned above, the total number of layers for all RBs assigned to a user or a particular RB is 6, with dedicated RS layers having indices 1,2,5,6 correspond to the other users. In this example, the user of interest has been assigned 16 QAM. Thus, the MAF has a bit for each one of these four layers, 1, 2, 5, 6, with the first, leftmost bit corresponding to the layer with the smallest index, 1 in this case. The last, rightmost bit can correspond to the layer with the largest index, 6 in this case. In each position, a 1 can imply a modulation identical to the user, here, 16 QAM, whereas a 0 can imply a modulation different from that assigned to the user. Moreover, for dedicated RS layers with indices lower than that corresponding to the user, 0 can imply a smaller modulation, which is 4 QAM in this case, whereas for dedicated RS layers with indices larger than that corresponding to the user, 0 implies a larger modulation, which is 64 QAM in this case.

Optionally, the BS can ensure that all overlapping scheduled MU-MIMO users are assigned the same modulation.

With reference now to Table 1 below, one specific embodiment of a field that can be transmitted to each MU-MIMO user from the base station is illustrated. The field can be a four-bit index that can convey the number of dedicated RS layers, implemented here as pilot streams, transmitted on any RB assigned to a given user. In particular, the four bit index can be used to identify the combination of the number of streams and the allocated pilot stream index (PSI) in a transmission with MU-MIMO, and the modulation constellation of a paired user in the case of 2 stream transmission. As shown in the table, the modulation constellation in this exemplary embodiment employed by the other user in the case of 2-stream transmission can be any one of QPSK, 16 QAM or 64 QAM.

TABLE 1

| Four-bit index | Number of streams on corresponding RB | PSI assigned to user | Modulation constellation employed by other user on corresponding RB |
|---|---|---|---|
| 0b0000 | 2 streams | stream1 | QPSK |
| 0b0001 | 2 streams | stream1 | 16 QAM |
| 0b0010 | 2 streams | stream1 | 64 QAM |
| 0b0011 | 2 streams | stream1 | Unknown or not available |
| 0b0100 | 2 streams | stream2 | QPSK |
| 0b0101 | 2 streams | stream2 | 16 QAM |
| 0b0110 | 2 streams | stream2 | 64 QAM |
| 0b0111 | 2 streams | stream2 | Unknown or not available |
| 0b1000 | 3 streams | stream1 | — |
| 0b1001 | 3 streams | stream2 | — |
| 0b1010 | 3 streams | stream3 | — |
| 0b1011 | 4 streams | stream1 | — |
| 0b1100 | 4 streams | stream2 | — |
| 0b1101 | 4 streams | stream3 | — |
| 0b1110 | 4 streams | stream4 | — |
| 0b1111 | Unknown or not available | Unknown or not available | Unknown or not available |

MU-MIMO Receiver

The scheduling information provided in accordance with exemplary implementations discussed above, can be employed in a variety of receiver designs. Such exemplary, high-level receiver design embodiments are described herein below. In particular, the receiver designs can exploit the knowledge of the precoding matrices, power levels, modulations and coding rates used for the other co-scheduled users. The scheduling information of the other overlapping co-scheduled users can be used to decode, as reliably as possible, data transmitted to the user of interest by the base station.

The complex baseband model at the user of interest, here, user 1, can be written as $$y = \tilde{H} g_1 x_1 + \sum_{k \neq 1} \tilde{H} g_k x_k + \tilde{n}.$$

The model is obtained after a "whitening" step so that the noise vector has uncorrelated elements. The channel $\tilde{H}$ and the precoding vectors $\{g_k\}$, which can be scaled by the corresponding power levels, are known to the users. Thus, the effective channel $H = [h_1, \ldots h_K] = \tilde{H}[g_1, \ldots g_K]$ is known to the user.

In an exemplary partial QR-MLD (soft output demodulation) receiver, the complex base-band model seen by the user of interest (user-1) at any sub-carrier when two users are co-scheduled on an RB containing that sub-carrier can be represented as $$y = H \begin{bmatrix} x_1 \\ x_2 \end{bmatrix} + n. \quad x_1, x_2$$

may correspond to QAM symbols and may denote the symbols intended for user-1 and the other co-scheduled user, respectively. $H = [h_1, h_2]$ denotes the effective channel matrix which is known to user-1 and note that user-1 also knows the modulation constellation from which $x_2$ is drawn. Using a modified QR decomposition of H the following model can be obtained:

$$\begin{bmatrix} z_1 \\ z_2 \end{bmatrix} = U * y = \begin{bmatrix} L_{11} & 0 \\ L_{21} & 1 \end{bmatrix} \begin{bmatrix} x_1 \\ x_2 \end{bmatrix} + \tilde{v},$$

where $L_{11}$ is positive valued.

The receiver then generates soft-outputs in the form of Max-Log LLRs (log likelihood ratios) for each coded bit associated with symbol $x_1$. For each M-QAM symbol $x_{1,j}$, the metric is defined as $Q(x_{1,j}) = |z_1 - L_{11} x_{1,j}|^2 + \min_{x_2} |z_2 - L_{21} x_{1,j} - x_2|^2$. Let $q_{1,j} = z_2 - L_{21} x_{1,j}$. The following is determined using two simple slicing operations in parallel: $Q(x_{1,j}) = |z_1 - L_{11} x_{1,j}|^2 + \min_{Rx_2} |q_{1,j}^R - x_2^R|^2 + \min_{Ix_2} a_{1,j}^I - x_2^I|^2$ Thus, the cost of determining all $\{Q(x_{1,j})\}_{j=1}^M$ is O(M) instead of $O(M^2)$.

The LLR of the $l^{th}$ coded bit associated with symbol $x_1$ can be computed as follows. First, the following is determined:

$$\hat{\lambda} = \min_{x_{1,j}} \{Q(x_{1,j})\}$$

$$x_{1,\hat{j}} = \operatorname{argmin}_{x_{1,j}} \{Q(x_{1,j})\}.$$

Then, if the $l^{th}$ coded bit associated with $x_{1,\hat{j}}$ is 1, then the following is used to determine the LLR: $\lambda_{1,l} = \|h_2\|^2 (\min_{x_{1,j}: b_{1l}=0} Q(x_{1,j}) - \hat{\lambda})$. Alternatively, if the $l^{th}$ coded bit associated with $x_{1,\hat{j}}$ is 0, the following is used to determine the LLR: $\lambda_{1,l} = \|h_2\|^2 (\hat{\lambda} - \min_{x_{1,j}: b_{1l}=1} Q(x_{1,j}))$. The computed LLRs are then fed to an outer-code decoder such as a Turbo-decoder which then decodes the codeword transmitted for user-1.

An enhanced partial QR-MLD receiver is an alternative exemplary receiver. Similar to the partial QR-MLD receiver, the complex base-band model seen by the user of interest (user-1) at any sub-carrier when two users are co-scheduled on an RB including that sub-carrier, is given by $$y = H \begin{bmatrix} x_1 \\ x_2 \end{bmatrix} + n.$$

Here the user of interest, user-1, knows the effective channel matrix $H = [h_1, h_2]$. It also knows the modulation constellation from which $x_2$ is drawn along with the coding rate used for the other user. Then, in the enhanced partial QR-MLD receiver, the partial QR-MLD receiver described above can be first employed to decode the codeword-1 (i.e., the codeword of user-1). If the decoded codeword-1 passes the cyclic redundancy check (CRC), an event which indicates that codeword-1 has been reliably decoded, then no further decoding operations are done. Else, the partial QR-MLD receiver is used by user-1 to decode codeword-2 (i.e., the codeword intended for the other user). If the decoded codeword-2 fails the CRC, then an error is declared by user-1 and it sends a decoding-error message to the BS. Else the re-constructed codeword-2 is subtracted from the received observation vectors {y}. A single-stream maximum ratio combining demodulator is used on the resulting received observation vectors to again decode codeword-1. If the decoded codeword-1 passes the CRC, then no further decoding operations are done. Else an error is declared by user-1 and it sends a decoding-error message to the BS.

CQI Computation and PMI Selection

As discussed above, exemplary embodiments of the present invention are directed to a MU-MIMO downlink channel where the base station may schedule several user terminals on the same RB. It is assumed in the following that each scheduled user is served a single data stream using beamforming techniques. As noted above, each active user may report a PMI to the BS, which is an index that identifies a particular vector in a code-book of unit norm vectors that is known in advance to the BS as well as all users. Each user may also report a CQI, which is based on its estimate of the signal-to-interference-plus-noise ratio (SINR). The reported PMIs and CQIs may then be employed by the BS to determine a suitable set of scheduled users and their assigned rates.

It should be understood that the methods discussed herein below can be employed by any given MU-MIMO user, such as user 102, to determine PMI and/or CQI indications for transmission to the base station in methods 800 and 1000 discussed at length above. For example, the methods discussed herein below may used to implement steps 802 and 1002 of methods 800 and 1000, respectfully. Moreover, it should also be understood that steps performed to implement PMI and/or CQI determination methods discussed herein below may also be added to methods 700, 800, 900 and 1000 as understood by those of ordinary skill in the art.

In accordance with various exemplary embodiments of the present invention, to determine PMIs and CQIs, a user can employ an accurate estimate of the interference it might encounter, if scheduled, from the signals intended for other co-scheduled users. As discussed further herein below, in a one exemplary embodiment, each user may select a PMI by maximizing a bound on the expected SINR. In another exemplary embodiment, each user may employ a selfish approach in that it assumes it alone will be scheduled and reports the PMI and CQI accordingly. According to another embodiment, each user may attempt to mitigate the interference it might encounter, if scheduled, by selecting a PMI using a quantization error minimizing strategy. It can be shown that the approach used in the first embodiment outperforms the other two embodiments for all SNRs of interest.

To illustrate how a PMI may be selected by maximizing a bound on the expected SINR in accordance with an exemplary embodiment of the present invention, a narrowband received signal model at a user terminal of interest is considered. In the model, the user of interest is equipped with N receive antennas and the base station has M transmit antennas, $$y = Hx + v \quad (1)$$

where $H \in \mathbb{C}^{N \times M}$ is the channel matrix and $v \sim CN(0,I)$ is the additive noise. The signal vector x transmitted by the BS can be expanded as $$x = \sum_{k \in S} g_k s_k \quad (2)$$

where S is the set of users that are scheduled, $g_k$ is the beamforming vector and $s_k$ is the data symbol corresponding to user $k \in S$. The beamforming vectors are selected from a codebook C of unit-norm vectors. The sum power constraint is given by $$E[x^\dagger x] = \Sigma_{k=1}^{|S|} E[|S_k|^2] \geq \rho.$$

To determine a suitable beamforming vector from C along with a channel quality index (CQI), the user of interest may employ the following rule:

$$\hat{c} = \underset{c \in C}{\operatorname{argmax}} \{c^\dagger H^\dagger (I + \hat{\rho} H H^\dagger)^{-1} H c\} \quad (3)$$

where $$\hat{\rho} = \frac{\rho(|S|-1)}{|S|(M-1)}$$

and M is the number of transmit antennas at the base station. Note that the user is assumed to know M along with an estimate of ρ. Further, it is assumed here that the user of interest knows |S|, the number of users that will be scheduled together by the BS. The user of interest can receive |S| from the base station with the user's scheduling information. Thus, for example, in methods 700 and 900 discussed above, a step may be added in which the base station 104 transmits |S| to each MU-MIMO user prior to receiving preferred PMI information and CQI indications. Alternatively, |S| can be an estimate of the number of users that the user of interest expects will be scheduled by the base station. In either case, it should be noted that |S| may be an upper bound on the total number of users that will be scheduled together by the BS. Furthermore, |S| may correspond to one or more sub-bands, such that different sub-bands can have different values of |S|, where the base station transmits each value of |S| for corresponding sub-bands to the MU-MIMO users. As noted below, a sub-band comprises a set of contiguous subcarriers.

Once ĉ is determined, the user of interest may determine the (unit norm) linear combiner as $$\hat{u} = \frac{(I + \hat{\rho} H H^\dagger)^{-1} H \hat{c}}{\|(I + \hat{\rho} H H^\dagger)^{-1} H \hat{c}\|} \quad (4)$$

In turn, the user may determine the CQI by using a look up table with the following estimated SINR $$\frac{\hat{\rho} \hat{c}^\dagger H^\dagger (I + \hat{\rho} H H^\dagger)^{-1} H \hat{c}}{1 - \hat{\rho} \hat{c}^\dagger H^\dagger (I + \hat{\rho} H H^\dagger)^{-1} H \hat{c}} \quad (5)$$

where $$\tilde{p} = \frac{\rho}{|S|}.$$

The rules discussed above account for the interference due to signals intended for the co-scheduled users and maximize a bound on the expected SINR.

As discussed above, the CQI and the PMI corresponding to the beamforming vector ĉ may be reported to the BS to permit scheduling of a set of users. Alternatively, the SINR in equation 5 and the PMI corresponding to the beamforming vector ĉ may be reported to the BS.

In accordance with another embodiment of the present invention, as noted above, the user of interest may perform PMI selection and CQI computation by using a selfish approach in that it assumes it alone will be scheduled. For example, to determine a suitable beamforming vector from C along with a channel quality index, the user of interest may use the following SU-MIMO rule:

$$\hat{c} = \underset{c \in C}{\operatorname{argmax}} \{c^\dagger H^\dagger H c\} \quad (6)$$

Once ĉ is determined, the user of interest may determine the (unit norm) linear combiner as $$\hat{u} = \frac{H\hat{c}}{\|H\hat{c}\|}. \quad (7)$$

In addition, the user of interest can determine the CQI using a look up table with the following estimated SINR $$\frac{\rho}{|S|} \hat{c}^\dagger H^\dagger H \hat{c}. \quad (8)$$

The CQI, or alternatively, SINR, and the PMI corresponding to the beamforming vector ĉ may be reported to the BS by the user.

In accordance with an alternative embodiment of the present invention, as noted above, the user of interest may mitigate the interference it might encounter by selecting a PMI using a quantization error minimizing strategy. For example, to determine a suitable beamforming vector from C along with a CQI, the user of interest may use the following quantization-error minimization based rule:

$$\hat{c} = \underset{c \in C}{\operatorname{argmax}} \{c^\dagger H^\dagger (HH^\dagger)^{-1} H c\} \quad (9)$$

Once ĉ is determined, the user of interest may determine the (unit norm) linear combiner as $$\hat{u} = \frac{(HH^\dagger)^{-1} H\hat{c}}{\|(HH^\dagger)^{-1} H\hat{c}\|} \quad (10)$$

Further, the user of interest determines the CQI is by using a look up table with either of the following estimated SINR:

$$\frac{\rho}{|S|} |u^\dagger H\hat{c}|^2 \quad (11)$$

or $$\frac{\frac{M-1}{|S|-1} \hat{c}^\dagger H^\dagger (HH^\dagger)^{-1} H\hat{c}}{1 - \hat{c}^\dagger H^\dagger (HH^\dagger)^{-1} H\hat{c}} \quad (12)$$

It should be noted that the SINR computed in equation 12 is the high SNR limit of the SINR computed in equation 5. The user of interest can report the CQI, or, alternatively, the SINR, and the PMI corresponding to the beamforming vector ĉ to the BS.

It can be shown that the PMI and CQI determination embodiment employing equations 3 and 5 outperforms the other or alternate PMI and CQI determination embodiments discussed above in all SNR regimes. The alternate embodiments fare particularly worse, as they do not account for the multi-user interference in their reported SINRs and consequently they over-estimate the SINR. Comparing the alternate embodiments, the SU-MIMO embodiment employing equations 6 and 8 outperforms the quantization minimizing embodiment employing equations 9 and 11 in the low SNR regime. Conversely, the quantization minimizing embodiment employing equations 9 and 11 outperforms the SU-MIMO embodiment employing equations 6 and 8 in both medium and high SNR regimes. In the low SNR regime, interference becomes negligible compared to the background noise, and thus the SU-MIMO embodiment has a better performance. For medium and high SNRs, interference resulting from the quantization error is dominant and hence the quantization minimizing approach performs better.

It should be understood that PMI and CQI determination can be tailored to the properties of a wideband OFDMA downlink. When OFDMA is employed for downlink transmission, the received signal at the user of interest and any subcarrier can be modeled as in equation (1). Due to limitations on the amount of feedback that can be sent to the BS, the available set of subcarriers may be partitioned into Q sub-bands as $\{B_1, B_2, \ldots, B_Q\}$, where each sub-band is a set of contiguous subcarriers. In accordance with exemplary embodiments, each user is permitted to report one CQI per sub-band. Further, the user may be permitted to either report one PMI per sub-band or report just one PMI for all available channels.

Figure 12:
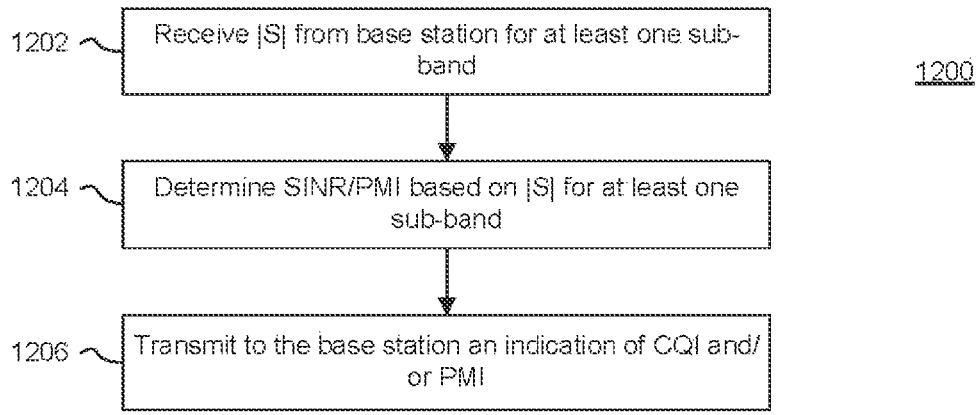
FIG. 12 is a block/flow diagram of a method for determining a PMI and/or a CQI indication in accordance with one exemplary embodiment of the present invention.

With reference now to FIG. 12, a method 1200 for determining a PMI and a CQI indication in accordance with one exemplary embodiment of the present invention is illustrated. As noted above, method 1200 can be used to implement steps 802 and 1002 of methods 800 and 1000, respectively. Method 1200 can begin, for example, at step 1202, by receiving |S| for at least one sub-band from the base station. As stated above, |S| is an indication of an estimate of or an upper-bound on the total number of MU-MIMO users that are co-scheduled by the base station on a corresponding sub-band. It should be noted that the base station can transmit one value of |S| per sub-band. Further, the sub-band can be expanded or contracted by the base station accordingly to obtain optimal performance. At step 1204, the MU-MIMO user can determine an SINR for at least one sub-band based on |S|. For example, the MU-MIMO user can determine the SINR by employing equations (5), (8), (11) or (12), as discussed above. Moreover, as stated above, the MU-MIMO user can employ the SINR to calculate a CQI using a lookup table. In addition, step 1204 may further include determining a PMI by employing equations (3), (6) or (9), as discussed above. At step 1206, the MU-MIMO user can transmit an indication of the CQI and/or the PMI. For example, the PMI indication can be only one PMI for all available sub-channels or it can be one PMI per sub-band, as stated above. Additionally, the CQI indication may be the CQI or the SINR and the CQI indication can be one CQI indication per sub-band, as discussed above. It should be noted that the indication of the CQI and/or the PMI can be transmitted at steps 804 and 1004 in methods 800 and 1000, respectfully.

Figure 13:
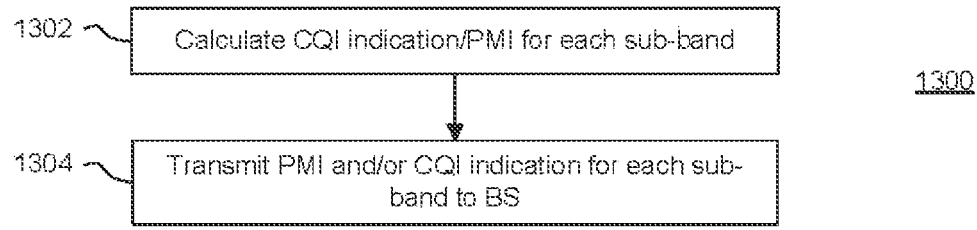
FIG. 13 is a block/flow diagram of another method for determining a PMI and a CQI indication in accordance with one exemplary embodiment of the present invention.
Figure 14:
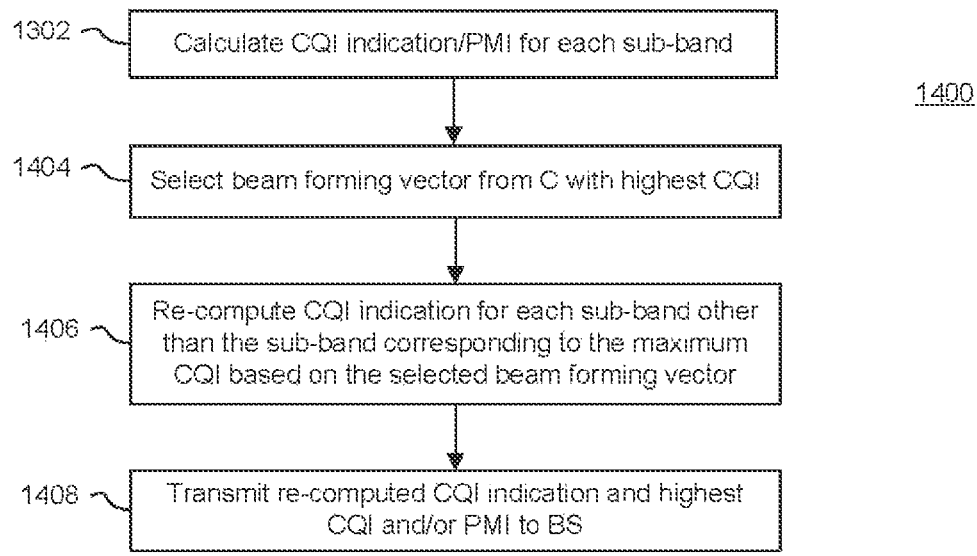
FIG. 14 is a block/flow diagram of an alternative detailed method for determining a PMI and a CQI indication in accordance with an exemplary embodiment of the present invention.

Referring to FIGS. 13 and 14 with continuing reference to FIG. 11, methods 1300 and 1400 for determining the CQI indication/PMI in accordance with exemplary embodiments of the present invention are illustrated. It should be understood that methods 1300 and/or 1400 may be employed to implement step 1204 of method 1200. Further, method 1300 can be used in the case in which each MU-MIMO user can report one CQI per sub-band and one PMI per sub-band while method 1400 can be used in the case in which each MU-MIMO user reports one CQI per sub-band and one PMI for all available channels.

Considering the first case in which each MU-MIMO user can report one CQI per sub-band and one PMI per sub-band, method 1300 may begin, for example, at step 1302 in which the CQI indication and/or the PMI can be calculated for each sub-band. The fact that the random channel matrices seen over different subcarriers in a sub-band are highly correlated can be exploited by defining a representative subcarrier for each sub-band. This representative subcarrier may, for example, be the subcarrier lying in the center of the sub-band. Letting $H^i$ denote the channel matrix seen by the user of interest on the representative subcarrier of the $i^{th}$ subband, the user can determine the PMI and the CQI indication for the $i^{th}$ subband using equations 3 and 5, respectively, after replacing H by $H^i$. The Q PMIs and/or Q CQI indications so determined may be transmitted to the BS at step 1304. It should be noted that the Q PMIs and/or Q CQI indications can be transmitted at step 1206 in method 1200. As noted above, a CQI indication can be a CQI or an SINR.

In the case in which each user reports one CQI per sub-band and one PMI, as in the previous case, the MU-MIMO user of interest may first perform step 1302 to determine the PMI and the CQI for the $i^{th}$ subband using equations 3 and 5, respectively, after replacing H by $H^i$. At step 1404, the user of interest can select the beam forming vector from C having the highest CQI of the CQIs calculated for each sub-band. For example, the user of interest may determine and select the maximum CQI among the computed CQIs. If ĉ is the beamforming vector corresponding to the maximum computed CQI, the user can select ĉ as its desired beamforming vector. At step 1406, the user of interest can recompute the CQIs for all the other Q−1 sub-bands not corresponding to the maximum by using ĉ in equation 5 after replacing H by the channel matrix of the appropriate representative subcarrier. At step 1408, the user of interest may transmit the PMI and/or Q CQIs so determined to the BS. It should be noted that the PMI and/or Q CQIs can be transmitted at step 1206 in method 1200.

In accordance with any of the different PMI and CQI determination embodiments discussed above, the BS may employ each user's reported CQI and PMI to schedule a suitable set of users. Further, the BS may use the reported PMI and CQI to implement steps 704 and 904 of methods 700 and 900 in which the scheduling information for MU-MIMO users is generated. For example, to serve each scheduled user, the BS may use the beamforming vector determined by the PMI it received from the corresponding scheduled user and may schedule a set of users whose reported beamforming vectors are either mutually orthogonal or close to orthogonal. For example, close to orthogonal beamforming vectors of any scheduled two users have an inner product whose magnitude is no greater than a predetermined constant ϵ. Furthermore, the BS may divide the available power ρ equally among the served users.

Let $\{1, \ldots, K\}$ denote the set of users. Let ĉ and $\alpha_k$ denote the precoding vector and SINR reported by user k, respectively. The BS can use the following greedy scheduling rule to schedule a suitable set of users. User k may choose ĉ by employing either equations 3, 6 or 9. Further, user k may compute the corresponding SINR using either equations 5, 8, 11 or 12. It should be noted that he BS can choose any value between 1 and M for |S| and may inform each user in advance, for example, by including |S| in a corresponding user's scheduling information in a previous sub-frame.

With reference now to Table 2, an algorithm that can be employed by a base station to schedule |S| users or less in accordance with an exemplary implementation of the present invention is illustrated. In the following algorithm, the BS adopts a greedy approach to determine a set of co-scheduled users. In particular, in each step of the algorithm, it considers each user that has not been selected yet and determines if it satisfies a near-orthogonality condition, i.e., if the precoding vector reported by that user is near-orthogonal to the ones reported by the users that have already been selected. Any user that fails to meet this near-orthogonality condition is removed from future consideration. The BS computes a rate increment for each user that satisfies this near-orthogonality condition, where the rate increment is an estimate of the increase in sum rate that can be achieved if the user is scheduled along with the already selected users. The BS then selects the user with the highest rate increment in that step and accordingly updates the set of users that have been selected and the set of users that have not been selected. The process continues until |S| users have been selected, no user that has not been selected yet meets the near-orthogonality condition, or the highest rate increment among all users that meet the near-orthogonality condition is not positive.

TABLE 2

Algorithm 1-User selection (Scheduling) Algorithm

Set $U = \{1, \ldots, K\}$ and $A = \phi$.
Repeat
$U' = \phi; x = 0, \hat{k} = \phi$
For each user $k \in U$
if $|\hat{c}_k^\dagger \hat{c}_j| \leq \epsilon, \forall j \in A$ then
Update $U' \rightarrow U' \cup k$ $$\text{Determine } u = \log\left(1 + \frac{|S|}{|A|+1}\alpha_k\right) + \Sigma_{j \in A} \log\left(1 + \frac{|S|}{|A|+1}\alpha_j\right) - \Sigma_{j \in A} \log\left(1 + \frac{|S|}{|A|}\alpha_j\right)$$

TABLE 2-continued

Algorithm 1-User selection (Scheduling) Algorithm

If u > x update x = u; $\hat{k} = k$
End If
End for
Set U = U\\$\hat{k}$ and A → A ∪ $\hat{k}$
Until U = φ or $\hat{k}$ = φ or |A| = |S|
Output: A is the set of users that are scheduled.

The rate assigned to user k ∈ A is equal to $R_k = \log\left(1 + \frac{|S|}{|A|}\alpha_k\right)$.

Let $\{\hat{g}_k\}$ be the beamforming vectors used to serve the scheduled users. As discussed above, the BS may inform each scheduled user about the power level, MCS and the beamforming vector or PMI used to serve it. The received signal at the user of interest, here user 1 in A, post-combining can now be written as $$\hat{u}_1^\dagger y_1 = \hat{u}_1^\dagger H_1 \hat{g}_1 s_1 + \sum_{k \in A, k \neq 1} \hat{u}_1^\dagger H_1 \hat{g}_k s_k + \tilde{v}_1 \quad (13)$$

Due to the normalization, $E[|\hat{v}_1|^2]=1$. The true SINR encountered by user 1 post-scheduling is equal to $$SINR_1^{true} = \frac{\frac{\rho}{|A|}|\hat{u}_1^\dagger H_1 \hat{g}_1|^2}{1 + \sum_{k \in A, k \neq 1} \frac{\rho}{|A|}|\hat{u}_1^\dagger H_1 \hat{g}_k|^2} \quad (14)$$

$SINR_1^{true}$ can be estimated by the user. It should be noted that user 1 can support its rate R1 only if $\log(1+SINR_1^{true}) \geq R_1$.

In certain scenarios, each scheduled user can also accurately estimate the covariance matrix of the interference plus noise, denoted by S. The optimal estimate for an arbitrary user, here user 1, is given by $$S = \left(I + \frac{\rho}{|A|}\sum_{k \in A, k \neq 1} H_1 \hat{g}_k \hat{g}_k^\dagger H_1^\dagger\right) \quad (15)$$

In this case the user can re-compute its linear combiner and SINR. In particular, user 1 may re-compute the linear combiner as $$\hat{u}_1 = S^{-1} H_1 \hat{g}_1 \quad (16)$$

and the true SINR as $$\frac{\rho}{|A|}\hat{g}_1^\dagger H_1^\dagger S^{-1} H_1 \hat{g}_1. \quad (17)$$

Furthermore, in another exemplary implementation, the BS may employ the scheduling algorithm described above with respect to Table 2 to first determine a set of users A. It can then inform each scheduled user in A about the power level and the beamforming vector or PMI used to serve it. Each scheduled user may then estimate its true SINR using (14) or (17) and report or feedback its estimated true SINR to the BS. Using the true SINR estimate received from a user in A, the BS can assign an MCS and inform the corresponding user about the assigned MCS.

It should be understood that the embodiments described herein may be entirely hardware or including both hardware and software elements. In a preferred embodiment, the present invention is implemented in hardware and software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores the program for use by or in connection with the instruction execution system, apparatus, or device. The medium can be magnetic, optical, electronic, electro-magnetic, infrared, or semiconductor system (or apparatus or device). The medium may include a computer-readable medium such as a semiconductor or solid state memory, magnetic tape, a removable computer diskette, a random access memory (RAM), a read-only memory (ROM), a rigid magnetic disk and an optical disk, etc.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method implemented in a base station for conveying scheduling information in an orthogonal frequency division multiple access (OFDMA) multi-user (MU)-multiple input multiple output (MIMO) system, the method comprising:
    transmitting to a user equipment (UE) the scheduling information for the UE in a transmission with MU-MIMO, wherein the scheduling information includes a resource block (RB) assigned to the UE, the number of streams, and an indication of a plurality of dedicated reference symbol (RS) layers assigned to the UE,
    wherein the dedicated RS layers have consecutive indices,
    wherein the scheduling information further includes at least one of modulation constellation of the UE, a coding rate of the UE, a precoder matrix index (PMI) of the UE, and a transmit power value of the UE, wherein at least one of the PMI and the transmit power value is transmitted to the UE using dedicated reference symbol (RS) layers, and wherein each of the dedicated RS layers is precoded with a precoder and is transmitted on a portion of an RB.

2. The method of claim 1, wherein the indication of a plurality of dedicated RS layers comprises an allocated pilot stream index (PSI).

3. The method of claim 2, wherein at least part of the scheduling information is conveyed by a four-bit index that identifies the number of said streams and the PSI.

4. An orthogonal frequency division multiple access (OFDMA) multi-user (MU)-multiple input multiple output (MIMO) system for conveying scheduling information, comprising:

a user equipment (UE);

a base station configured to transmit to the UE the scheduling information for the UE in a transmission with MU-MIMO, wherein the scheduling information includes resource block (RB) assigned to the UE, the number of streams, and an indication of a plurality of dedicated reference symbol (RS) layers assigned to the UE, wherein the dedicated RS layers have consecutive indices, wherein the scheduling information further includes at least one of modulation constellation of the UE, a coding rate of the UE, a precoder matrix index (PMI) of the UE, and a transmit power value of the UE, wherein at least one of the PMI and the transmit power value is transmitted to the UE using dedicated reference symbol (RS) layers, and wherein each of the dedicated RS layers is precoded with a precoder and is transmitted on a portion of an RB.

5. The system of claim 4, wherein the indication of a plurality of dedicated RS layers comprises an allocated pilot stream index (PSI).

6. The system of claim 5, wherein at least part of the scheduling information is conveyed by a four-bit index that identifies the number of said streams and the PSI.

7. A user equipment (UE) used in an orthogonal frequency division multiple access (OFDMA) multi-user (MU)-multiple input multiple output (MIMO) system conveying scheduling information from a base station, the UE comprising:

a receiving unit to receive the scheduling information for the UE in a transmission with MU-MIMO, wherein the scheduling information includes resource block (RB) assigned to the UE, the number of streams, and an indication of a plurality of dedicated reference symbol (RS) layers assigned to the UE, wherein the dedicated RS layers have consecutive indices, wherein the scheduling information further includes at least one of modulation constellation of the UE, a coding rate of the UE, a precoder matrix index (PMI) of the UE, and a transmit power value of the UE, wherein at least one of the PMI and the transmit power value is transmitted to the UE using dedicated reference symbol (RS) layers, and wherein each of the dedicated RS layers is precoded with a precoder and is transmitted on a portion of an RB.

8. The UE of claim 7, wherein the indication of a plurality of dedicated RS layers comprises an allocated pilot stream index (PSI).

9. The UE of claim 8, wherein at least part of the scheduling information is conveyed by a four-bit index that identifies the number of said streams and the PSI.

10. A base station for conveying scheduling information in an orthogonal frequency division multiple access (OFDMA) multi-user (MU)-multiple input multiple output (MIMO) system, the method comprising:

a transmission unit to transmit to a user equipment (UE) the scheduling information for the UE in a transmission with MU-MIMO, wherein the scheduling information includes a resource block (RB) assigned to the UE, the number of streams, and an indication of a plurality of dedicated reference symbol (RS) layers assigned to the UE, wherein the dedicated RS layers have consecutive indices, wherein the scheduling information further includes at least one of modulation constellation of the UE, a coding rate of the UE, a precoder matrix index (PMI) of the UE, and a transmit power value of the UE, wherein at least one of the PMI and the transmit power value is transmitted to the UE using dedicated reference symbol (RS) layers, and wherein each of the dedicated RS layers is precoded with a precoder and is transmitted on a portion of an RB.

11. The base station of claim 10, wherein the indication of a plurality of dedicated RS layers comprises an allocated pilot stream index (PSI).

12. The base station of claim 11, wherein at least part of the scheduling information is conveyed by a four-bit index that identifies the number of said streams and the PSI.

\* \* \* \* \*